(12) United States Patent
Yonetani et al.

(10) Patent No.: US 9,081,166 B2
(45) Date of Patent: Jul. 14, 2015

(54) INNER FOCUS LENS SYSTEM, INTERCHANGEABLE LENS APPARATUS AND CAMERA SYSTEM

(71) Applicant: Panasonic Corporation, Kadoma-shi, Osaka (JP)

(72) Inventors: Yusuke Yonetani, Osaka (JP); Yoshio Matsumura, Osaka (JP); Satoshi Kuzuhara, Hyogo (JP); Tomoko Iiyama, Osaka (JP); Masafumi Sueyoshi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 32 days.

(21) Appl. No.: 14/098,546

(22) Filed: Dec. 6, 2013

(65) Prior Publication Data
US 2014/0184887 A1    Jul. 3, 2014

(30) Foreign Application Priority Data

Dec. 27, 2012 (JP) .................................. 2012-284194
Oct. 23, 2013 (JP) .................................. 2013-220334

(51) Int. Cl.
*G02B 13/00* (2006.01)
*H04N 5/232* (2006.01)

(52) U.S. Cl.
CPC .................................. *G02B 13/0015* (2013.01)

(58) Field of Classification Search
CPC .................................. G02B 13/0015; H04N 5/23212
USPC .......... 348/345, 349, 335; 359/684, 754, 557, 359/749–753
See application file for complete search history.

(56) References Cited

U.S. PATENT DOCUMENTS

| | | | | |
|---|---|---|---|---|
| 6,445,511 B1* | 9/2002 | Kitahara | ....................... | 359/748 |
| 8,305,692 B2* | 11/2012 | Shimizu et al. | ............... | 359/684 |
| 2002/0075570 A1* | 6/2002 | Yamakawa | ..................... | 359/684 |
| 2013/0141629 A1* | 6/2013 | Yoshinaga et al. | ............ | 348/345 |
| 2013/0162886 A1* | 6/2013 | Morooka et al. | .............. | 348/345 |
| 2013/0162887 A1* | 6/2013 | Morooka | ....................... | 359/781 |
| 2013/0293767 A1* | 11/2013 | Imaoka et al. | ................ | 348/345 |
| 2014/0022437 A1* | 1/2014 | Kuzuhara et al. | ............ | 348/345 |
| 2014/0022438 A1* | 1/2014 | Kuzuhara et al. | ............ | 348/345 |

FOREIGN PATENT DOCUMENTS

| | | |
|---|---|---|
| JP | 2000-056217 A | 2/2000 |
| JP | 2000-214386 A | 8/2000 |

(Continued)

*Primary Examiner* — Tuan Ho
*Assistant Examiner* — Marly Camargo
(74) *Attorney, Agent, or Firm* — James W. Judge

(57) ABSTRACT

An inner focus lens system comprising lens units each composed of at least one lens element, wherein a most object side lens unit is provided and is fixed with respect to an image surface in focusing, and the conditions: BF/Y<1.7 and $(L \times F_{No})/f < 2.2$ (BF: a distance from an image side surface apex of a most image side lens element to the image surface, $Y=f \times \tan \omega$, L: an overall length of lens system, $F_{No}$: a F-number of lens system, f: a focal length of lens system, $\omega$: a half view angle of lens system) are simultaneously satisfied, or only the condition: $(L \times F_{No})/f < 2.0$ (L: the overall length of lens system, $F_{No}$: the F-number of lens system, f: the focal length of lens system) is satisfied.

13 Claims, 15 Drawing Sheets

(56) References Cited

FOREIGN PATENT DOCUMENTS

| JP | 2002-055279 | A | 2/2002 |
| JP | 2012-002999 | A | 1/2012 |
| JP | 2012-027349 | A | 2/2012 |
| JP | 2012-189679 | A | 10/2012 |

* cited by examiner

INNER FOCUS LENS SYSTEM, INTERCHANGEABLE LENS APPARATUS AND CAMERA SYSTEM

CROSS-REFERENCE TO RELATED APPLICATION

This application is based on application No. 2012-284194 filed in Japan on Dec. 27, 2012 and application No. 2013-220334 filed in Japan on Oct. 23, 2013, the contents of which are hereby incorporated by reference.

BACKGROUND

1. Field

The present disclosure relates to inner focus lens systems, interchangeable lens apparatuses and camera systems.

2. Description of the Related Art

Interchangeable lens apparatuses, camera systems and the like, each including an image sensor for performing photoelectric conversion, are strongly required to achieve size reduction and performance improvement. Various kinds of lens systems used in such interchangeable lens apparatuses and camera systems have been proposed.

Japanese Laid-Open Patent Publication No. 2012-027349 discloses an inner focus lens system including a first lens unit having positive refractive power, a second lens unit, and a third lens unit having positive refractive power. In focusing from an infinity in-focus condition to a close-object in-focus condition, the first lens unit is fixed with respect to an image surface, the second lens unit moves along an optical axis, and the third lens unit is fixed with respect to the image surface.

Japanese Laid-Open Patent Publication No. 2012-189679 discloses an inner focus lens system including a first lens unit having positive refractive power, a second lens unit, and a third lens unit. In focusing from an infinity in-focus condition to a close-object in-focus condition, the first lens unit is fixed with respect to the image surface, the second lens unit moves along the optical axis, and the third lens unit is fixed with respect to the image surface.

SUMMARY

The present disclosure provides an inner focus lens system which is compact and yet has high resolution and excellent performance, in which occurrences of various aberrations are sufficiently suppressed. Further, the present disclosure provides an interchangeable lens apparatus including the inner focus lens system, and a camera system including the interchangeable lens apparatus.

The novel concepts disclosed herein were achieved in order to solve the foregoing problems in the related art, and herein is disclosed:

an inner focus lens system comprising lens units each being composed of at least one lens element, wherein a most object side lens unit located closest to an object side is provided, the most object side lens unit is fixed with respect to an image surface in focusing from an infinity in-focus condition to a close-object in-focus condition, and the following conditions (1) and (2) are simultaneously satisfied, or only the following condition (2)' is satisfied:

$$BF/Y<1.7 \qquad (1)$$

$$(L\times F_{No})/f<2.2 \qquad (2)$$

$$(L\times F_{No})/f<2.0 \qquad (2)'$$

where

BF is a distance from an apex of an image side surface of a lens element located closest to an image side in the lens system, to the image surface, Y is a value expressed by the following formula:

$$Y=f\times\tan\omega$$

L is an overall length of lens system (an axial distance from an object side surface of a lens element located closest to the object side in the lens system, to the image surface), $F_{No}$ is a F-number of the lens system, f is a focal length of the lens system, and ω is a half view angle of the lens system.

The novel concepts disclosed herein were achieved in order to solve the foregoing problems in the related art, and herein is disclosed:

an interchangeable lens apparatus comprising:

an inner focus lens system; and a lens mount section which is connectable to a camera body including an image sensor for receiving an optical image formed by the inner focus lens system and converting the optical image into an electric image signal, wherein the inner focus lens system is an inner focus lens system comprising lens units each being composed of at least one lens element, wherein a most object side lens unit located closest to an object side is provided, the most object side lens unit is fixed with respect to an image surface in focusing from an infinity in-focus condition to a close-object in-focus condition, and the following conditions (1) and (2) are simultaneously satisfied, or only the following condition (2)' is satisfied:

$$BF/Y<1.7 \qquad (1)$$

$$(L\times F_{No})/f<2.2 \qquad (2)$$

$$(L\times F_{No})/f<2.0 \qquad (2)'$$

where

BF is a distance from an apex of an image side surface of a lens element located closest to an image side in the lens system, to the image surface, Y is a value expressed by the following formula:

$$Y=f\times\tan\omega$$

L is an overall length of lens system (an axial distance from an object side surface of a lens element located closest to the object side in the lens system, to the image surface), $F_{No}$ is a F-number of the lens system, f is a focal length of the lens system, and ω is a half view angle of the lens system.

The novel concepts disclosed herein were achieved in order to solve the foregoing problems in the related art, and herein is disclosed:

a camera system comprising:

an interchangeable lens apparatus including an inner focus lens system; and a camera body which is detachably connected to the interchangeable lens apparatus via a camera mount section, and includes an image sensor for receiving an optical image formed by the inner focus lens system and converting the optical image into an electric image signal, wherein the inner focus lens system is an inner focus lens system comprising lens units each being composed of at least one lens element, wherein a most object side lens unit located closest to an object side is provided, the most object side lens unit is fixed with respect to an image surface in focusing from an infinity in-focus condition to a close-object in-focus condition, and the following conditions (1) and (2) are simultaneously satisfied, or only the following condition (2)' is satisfied:

$$BF/Y < 1.7 \quad (1)$$

$$(L \times F_{No})/f < 2.2 \quad (2)$$

$$(L \times F_{No})/f < 2.0 \quad (2)'$$

where

BF is a distance from an apex of an image side surface of a lens element located closest to an image side in the lens system, to the image surface, Y is a value expressed by the following formula:

$$Y = f \times \tan \omega$$

L is an overall length of lens system (an axial distance from an object side surface of a lens element located closest to the object side in the lens system, to the image surface), $F_{No}$ is a F-number of the lens system, f is a focal length of the lens system, and ω is a half view angle of the lens system.

The inner focus lens system according to the present disclosure is compact and yet has high resolution and excellent performance, in which occurrences of various aberrations are sufficiently suppressed.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

(Embodiments 1 to 7)

FIGS. 1, 4, 7, 10, 13, 16, and 19 are lens arrangement diagrams of inner focus lens systems according to Embodiments 1 to 7, respectively, and each FIG. shows an inner focus lens system in an infinity in-focus condition.

In each FIG., an arrow parallel to the optical axis, imparted to a lens unit, indicates a direction along which the lens unit moves in focusing from an infinity in-focus condition to a close-object in-focus condition. In each FIG., an arrow perpendicular to the optical axis, imparted to a lens unit, indicates that the lens unit is an image blur compensating lens unit that moves in a direction perpendicular to the optical axis in order to optically compensate image blur.

In each FIG., an asterisk "*" imparted to a particular surface indicates that the surface is aspheric. Further, in each FIG., a symbol (+) or (−) imparted to the symbol of each lens unit corresponds to the sign of the optical power of the lens unit. Still further, in each FIG., a straight line located on the most right-hand side indicates the position of an image surface S.

(Embodiment 1)

Figure 1:
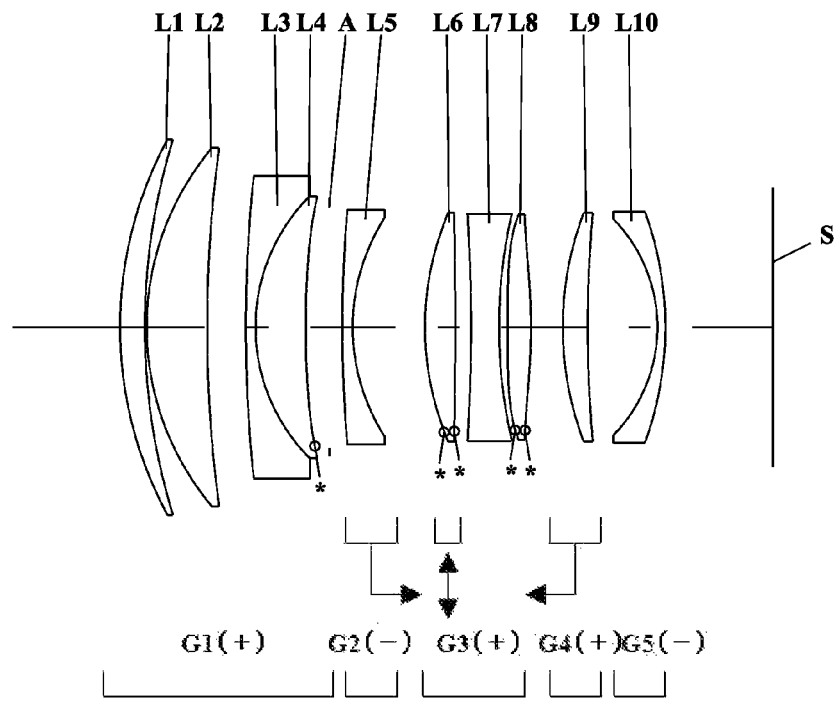
FIG. 1 is a lens arrangement diagram showing an infinity in-focus condition of an inner focus lens system according to Embodiment 1 (Numerical Example 1)
Figure 2:
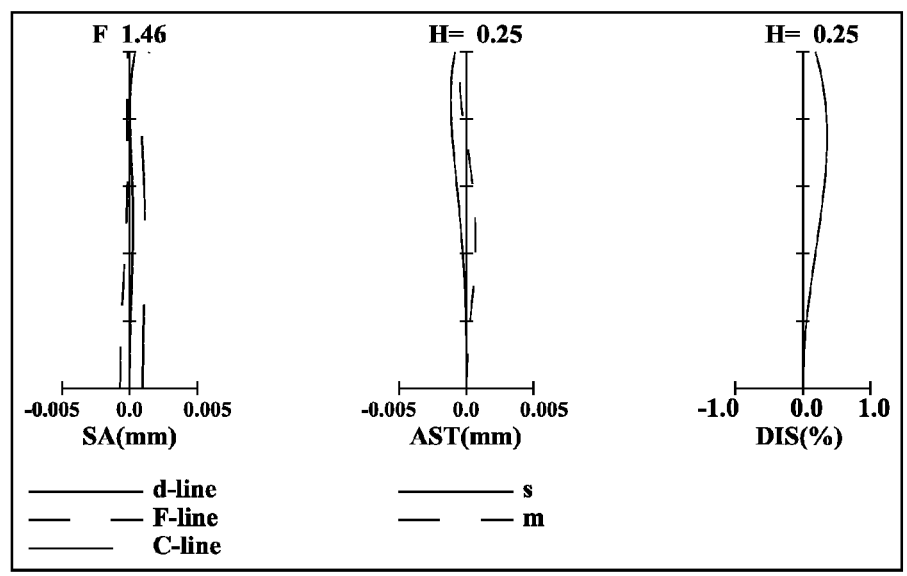
FIG. 2 is a longitudinal aberration diagram of the infinity in-focus condition of the inner focus lens system according to Numerical Example 1.
Figure 3:
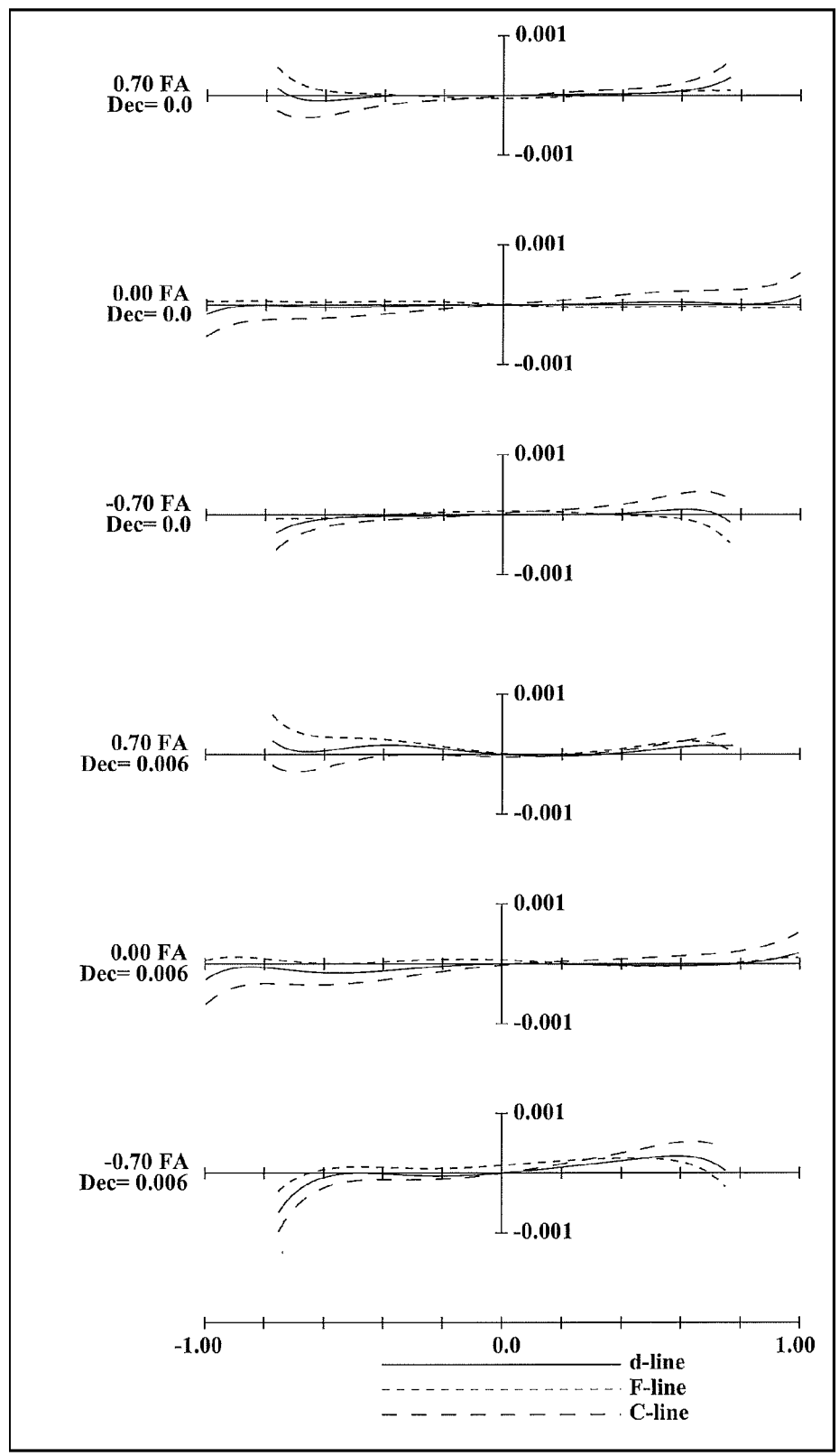
FIG. 3 is a lateral aberration diagram of the infinity in-focus condition of the inner focus lens system according to Numerical Example 1, in a basic state where image blur compensation is not performed and in an image blur compensation state.

As shown in FIG. 1, a first lens unit G1 having positive optical power, in order from the object side to the image side, comprises: a positive meniscus first lens element L1 with the convex surface facing the object side; a positive meniscus second lens element L2 with the convex surface facing the object side; a negative meniscus third lens element L3 with the convex surface facing the object side; and a positive meniscus fourth lens element L4 with the convex surface facing the object side. Among these, the third lens element L3 and the fourth lens element L4 are cemented with each other. The fourth lens element L4 has an aspheric image side surface. In the first lens unit G1, an aperture diaphragm A is provided on the image side relative to the fourth lens element L4.

A second lens unit G2 having negative optical power comprises solely a negative meniscus fifth lens element L5 with the convex surface facing the object side.

A third lens unit G3 having positive optical power, in order from the object side to the image side, comprises: a bi-convex sixth lens element L6; a bi-concave seventh lens element L7; and a positive meniscus eighth lens element L8 with the convex surface facing the image side. The sixth lens element L6 has two aspheric surfaces, and the eighth lens element L8 has two aspheric surfaces.

A fourth lens unit G4 having positive optical power comprises solely a positive meniscus ninth lens element L9 with the convex surface facing the object side.

A fifth lens unit G5 having negative optical power comprises solely a negative meniscus tenth lens element L10 with the convex surface facing the image side.

In the inner focus lens system according to Embodiment 1, in focusing from an infinity in-focus condition to a close-object in-focus condition, the second lens unit G2 moves to the image side along the optical axis, and the fourth lens unit G4 moves to the object side along the optical axis.

By moving the sixth lens element L6 as a part of the third lens unit G3 in the direction perpendicular to the optical axis, image point movement caused by vibration of the entire system can be compensated. That is, image blur caused by hand blurring, vibration and the like can be compensated optically.

(Embodiment 2)

Figure 4:
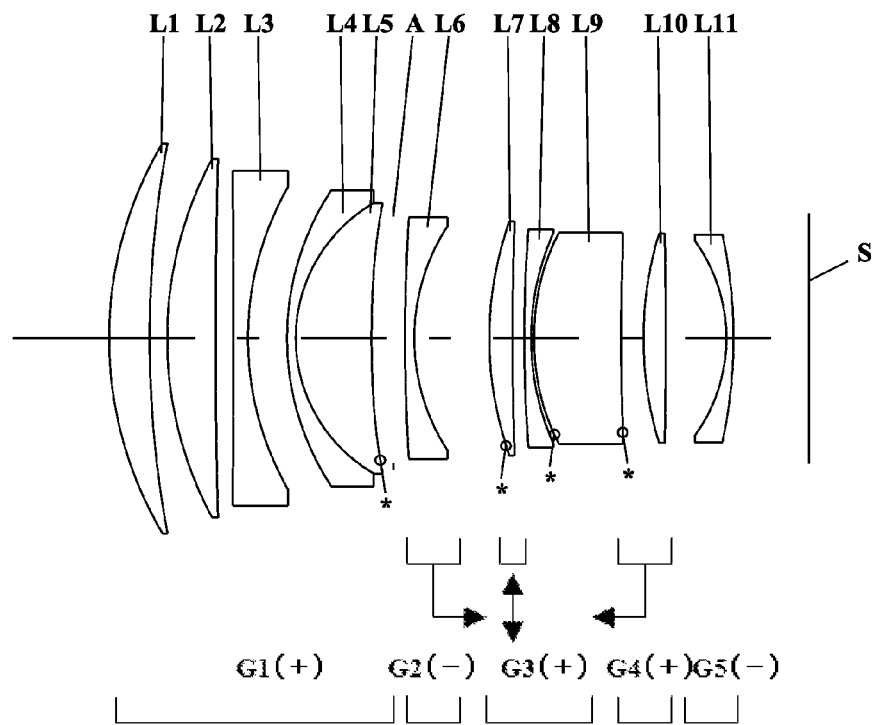
FIG. 4 is a lens arrangement diagram showing an infinity in-focus condition of an inner focus lens system according to Embodiment 2 (Numerical Example 2)
Figure 5:
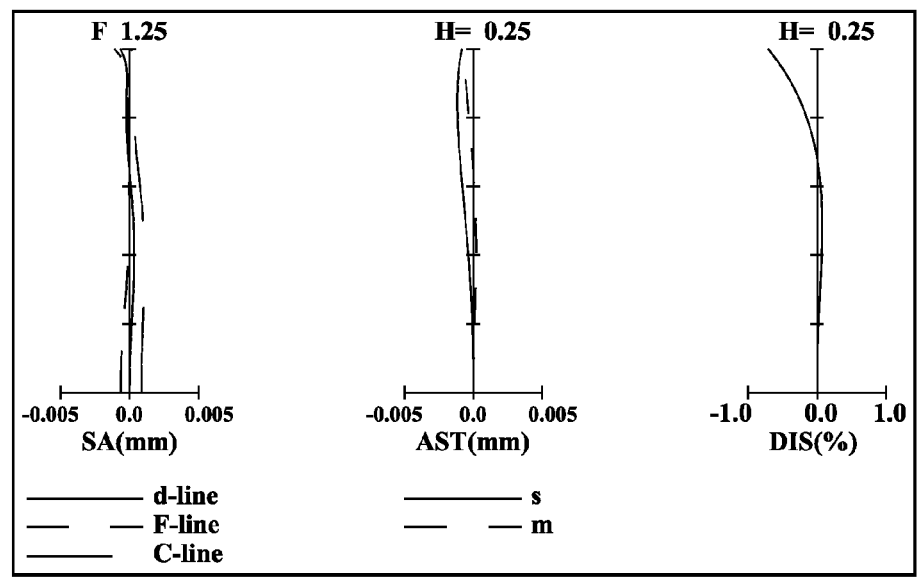
FIG. 5 is a longitudinal aberration diagram of the infinity in-focus condition of the inner focus lens system according to Numerical Example 2.
Figure 6:
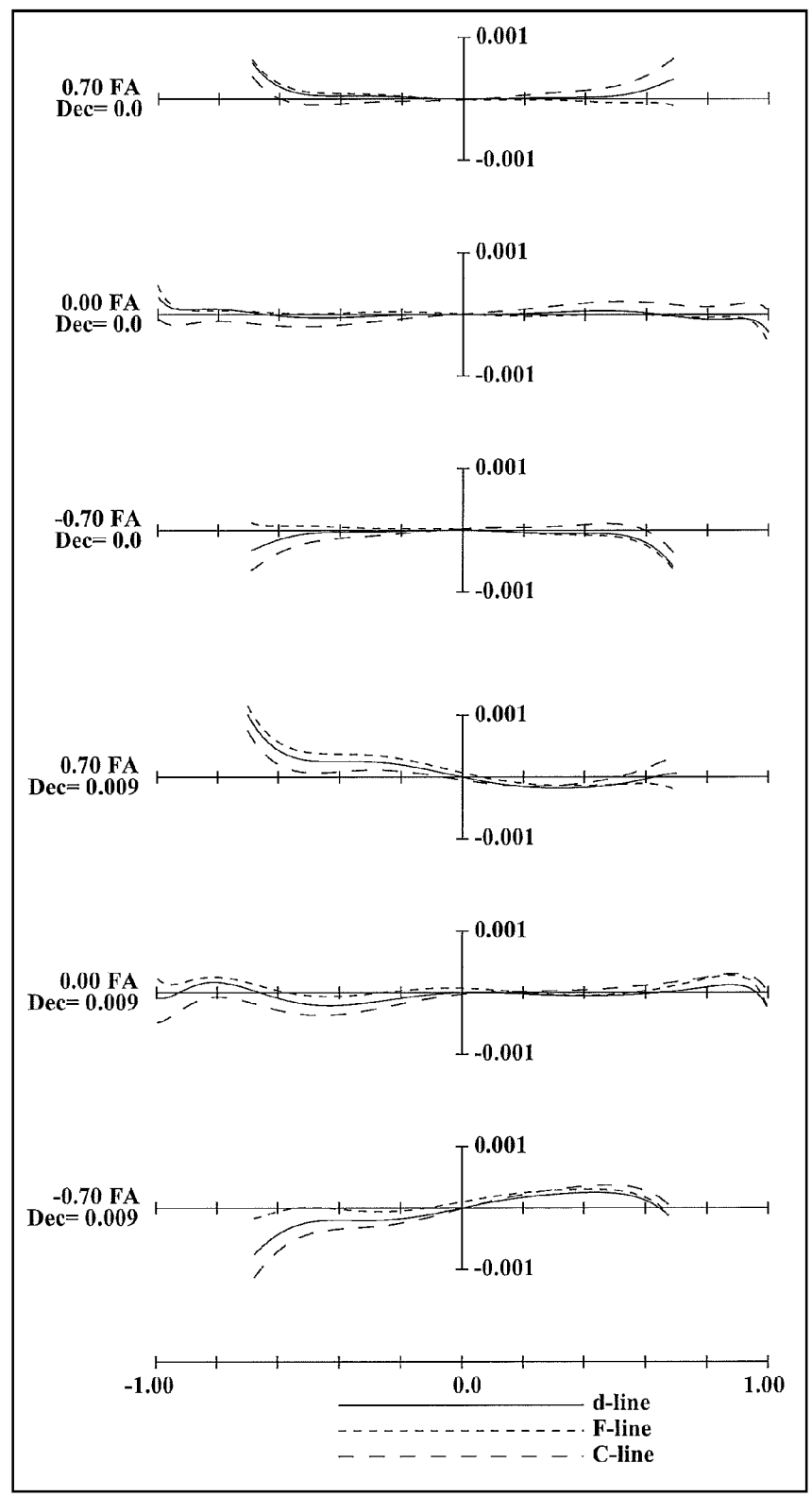
FIG. 6 is a lateral aberration diagram of the infinity in-focus condition of the inner focus lens system according to Numerical Example 2, in a basic state where image blur compensation is not performed and in an image blur compensation state.

As shown in FIG. 4, a first lens unit G1 having positive optical power, in order from the object side to the image side, comprises: a positive meniscus first lens element L1 with the convex surface facing the object side; a positive meniscus second lens element L2 with the convex surface facing the object side; a bi-concave third lens element L3; a negative meniscus fourth lens element L4 with the convex surface facing the object side; and a positive meniscus fifth lens element L5 with the convex surface facing the object side. Among these, the fourth lens element L4 and the fifth lens element L5 are cemented with each other. The fifth lens element L5 has an aspheric image side surface. In the first lens unit G1, an aperture diaphragm A is provided on the image side relative to the fifth lens element L5.

A second lens unit G2 having negative optical power comprises solely a negative meniscus sixth lens element L6 with the convex surface facing the object side.

A third lens unit G3 having positive optical power, in order from the object side to the image side, comprises: a positive meniscus seventh lens element L7 with the convex surface facing the object side; a negative meniscus eighth lens element L8 with the convex surface facing the object side; and a positive meniscus ninth lens element L9 with the convex surface facing the object side. The seventh lens element L7 has an aspheric object side surface, and the ninth lens element L9 has two aspheric surfaces.

A fourth lens unit G4 having positive optical power comprises solely a bi-convex tenth lens element L10.

A fifth lens unit G5 having negative optical power comprises solely a negative meniscus eleventh lens element L11 with the convex surface facing the image side.

In the inner focus lens system according to Embodiment 2, in focusing from an infinity in-focus condition to a close-object in-focus condition, the second lens unit G2 moves to the image side along the optical axis, and the fourth lens unit G4 moves to the object side along the optical axis.

By moving the seventh lens element L7 as a part of the third lens unit G3 in the direction perpendicular to the optical axis, image point movement caused by vibration of the entire system can be compensated. That is, image blur caused by hand blurring, vibration and the like can be compensated optically.

(Embodiment 3)

Figure 7:
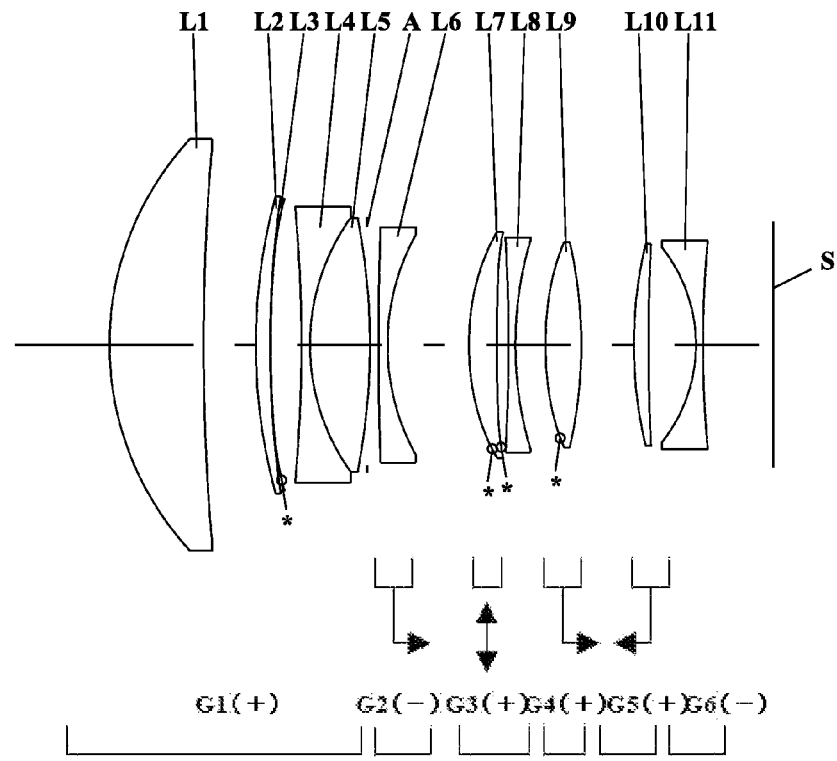
FIG. 7 is a lens arrangement diagram showing an infinity in-focus condition of an inner focus lens system according to Embodiment 3 (Numerical Example 3)
Figure 8:
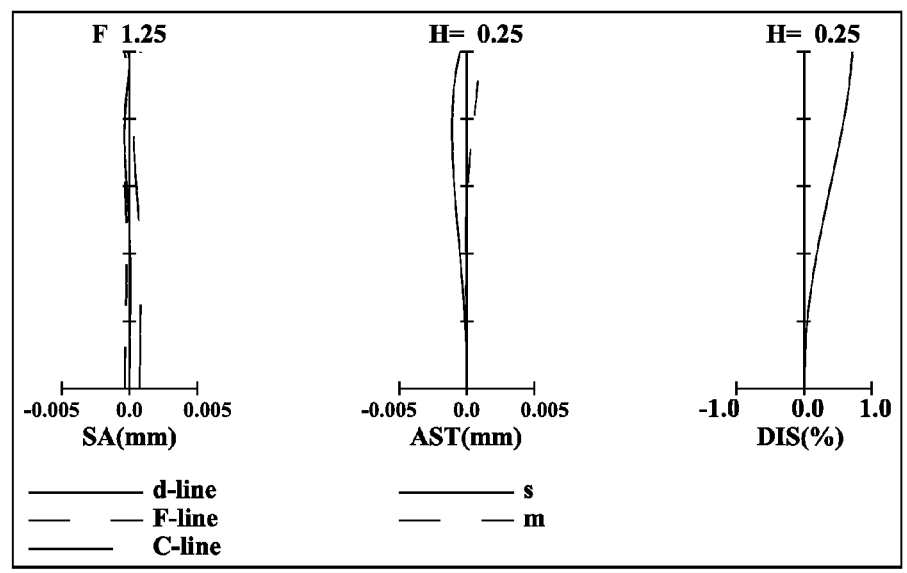
FIG. 8 is a longitudinal aberration diagram of the infinity in-focus condition of the inner focus lens system according to Numerical Example 3.
Figure 9:
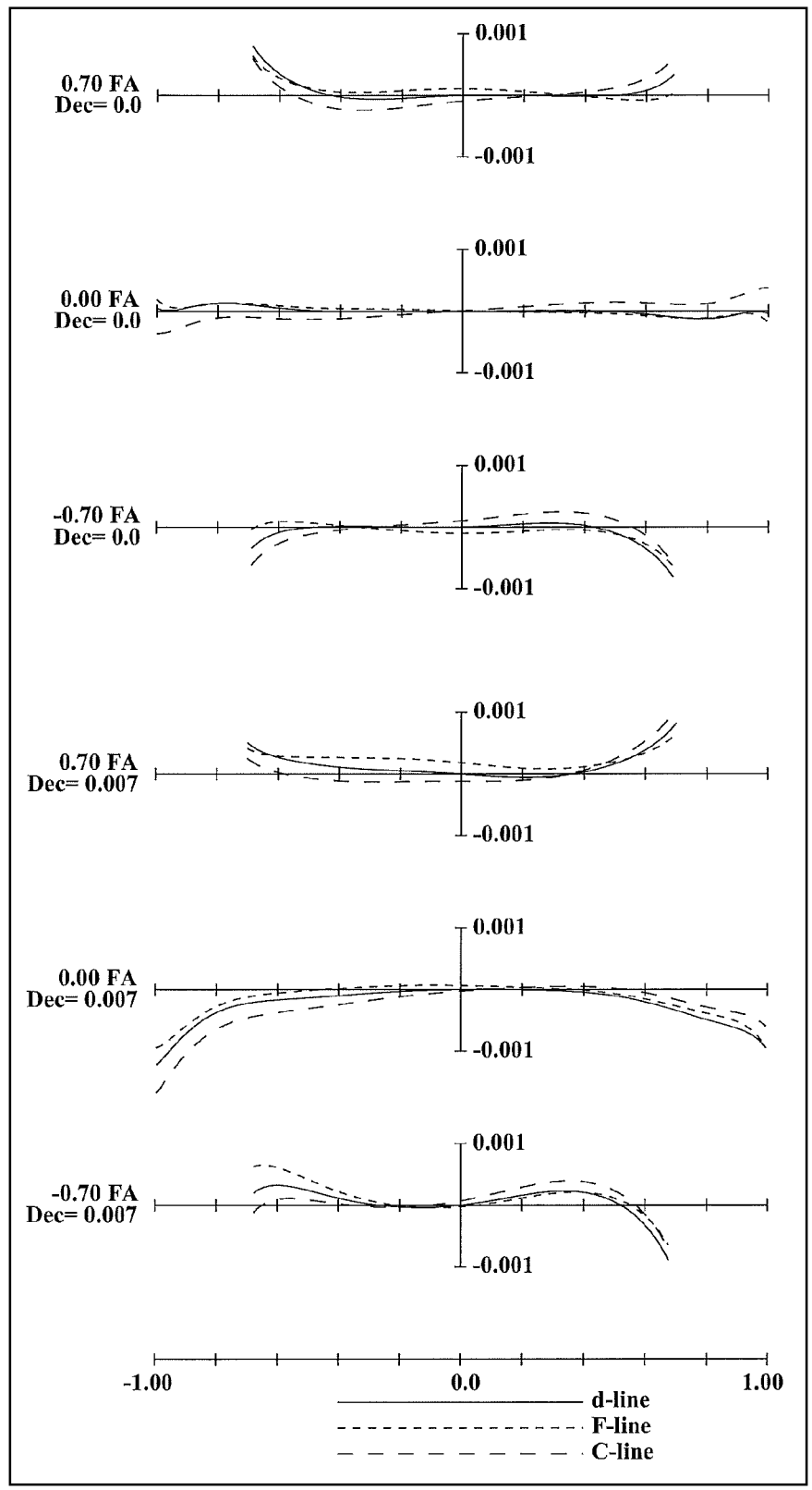
FIG. 9 is a lateral aberration diagram of the infinity in-focus condition of the inner focus lens system according to Numerical Example 3, in a basic state where image blur compensation is not performed and in an image blur compensation state.

As shown in FIG. 7, a first lens unit G1 having positive optical power, in order from the object side to the image side, comprises: a positive meniscus first lens element L1 with the convex surface facing the object side; a positive meniscus second lens element L2 with the convex surface facing the object side; a positive meniscus third lens element L3 with the convex surface facing the object side; a bi-concave fourth lens element L4; and a bi-convex fifth lens element L5. Among these, the second lens element L2 and the third lens element L3 are cemented with each other, and the fourth lens element L4 and the fifth lens element L5 are cemented with each other. The third lens element L3 has an aspheric image side surface. In the first lens unit G1, an aperture diaphragm A is provided on the image side relative to the fifth lens element L5.

A second lens unit G2 having negative optical power comprises solely a negative meniscus sixth lens element L6 with the convex surface facing the object side.

A third lens unit G3 having positive optical power, in order from the object side to the image side, comprises: a positive meniscus seventh lens element L7 with the convex surface facing the object side; and a bi-concave eighth lens element L8. The seventh lens element L7 has two aspheric surfaces.

A fourth lens unit G4 having positive optical power comprises solely a bi-convex ninth lens element L9. The ninth lens element L9 has an aspheric object side surface.

A fifth lens unit G5 having positive optical power comprises solely a positive meniscus tenth lens element L10 with the convex surface facing the object side.

A sixth lens unit G6 having negative optical power comprises solely a bi-concave eleventh lens element L11.

In the inner focus lens system according to Embodiment 3, in focusing from an infinity in-focus condition to a close-object in-focus condition, the second lens unit G2 and the fourth lens unit G4 move to the image side along the optical axis, and the fifth lens unit G5 moves to the object side along the optical axis.

By moving the seventh lens element L7 as a part of the third lens unit G3 in the direction perpendicular to the optical axis, image point movement caused by vibration of the entire system can be compensated. That is, image blur caused by hand blurring, vibration and the like can be compensated optically.

(Embodiment 4)

Figure 10:
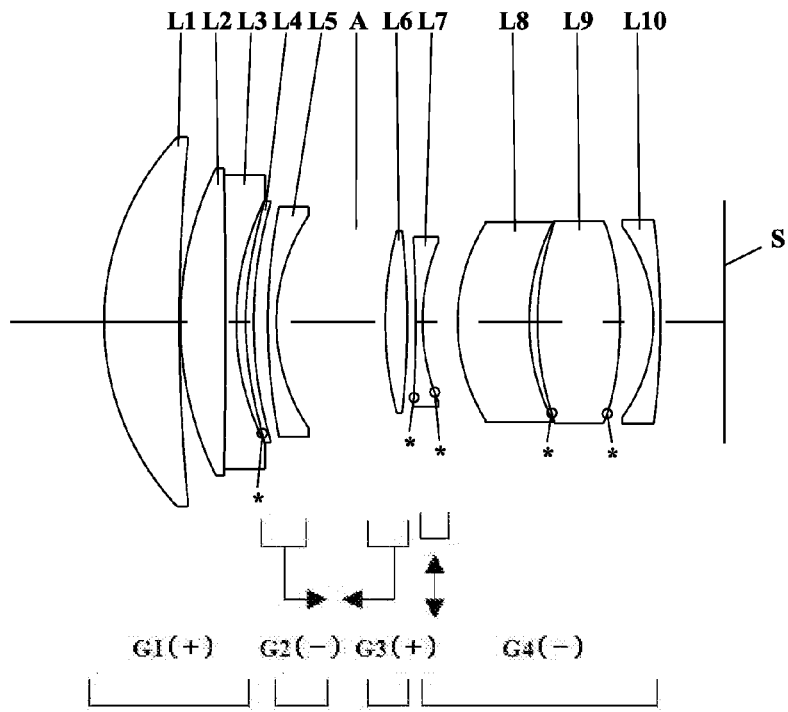
FIG. 10 is a lens arrangement diagram showing an infinity in-focus condition of an inner focus lens system according to Embodiment 4 (Numerical Example 4)
Figure 11:
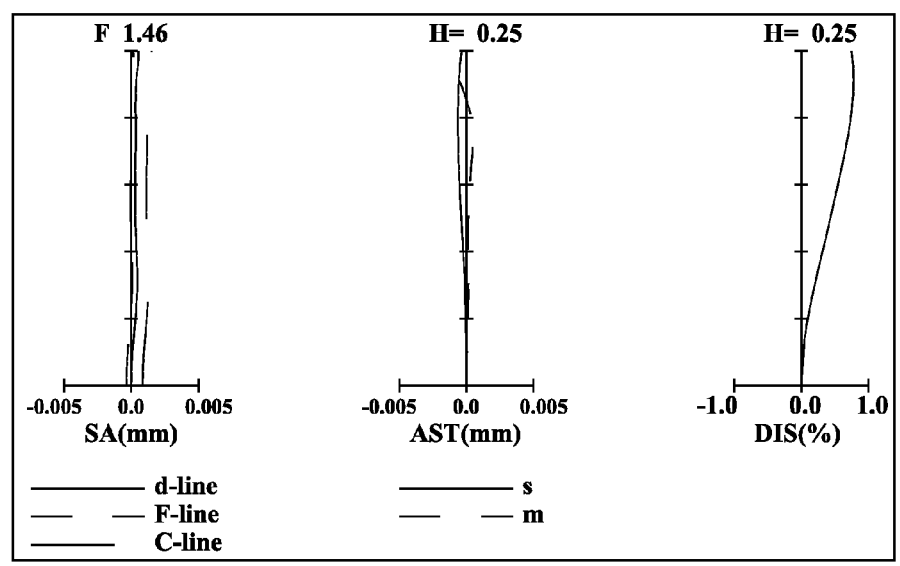
FIG. 11 is a longitudinal aberration diagram of the infinity in-focus condition of the inner focus lens system according to Numerical Example 4.
Figure 12:
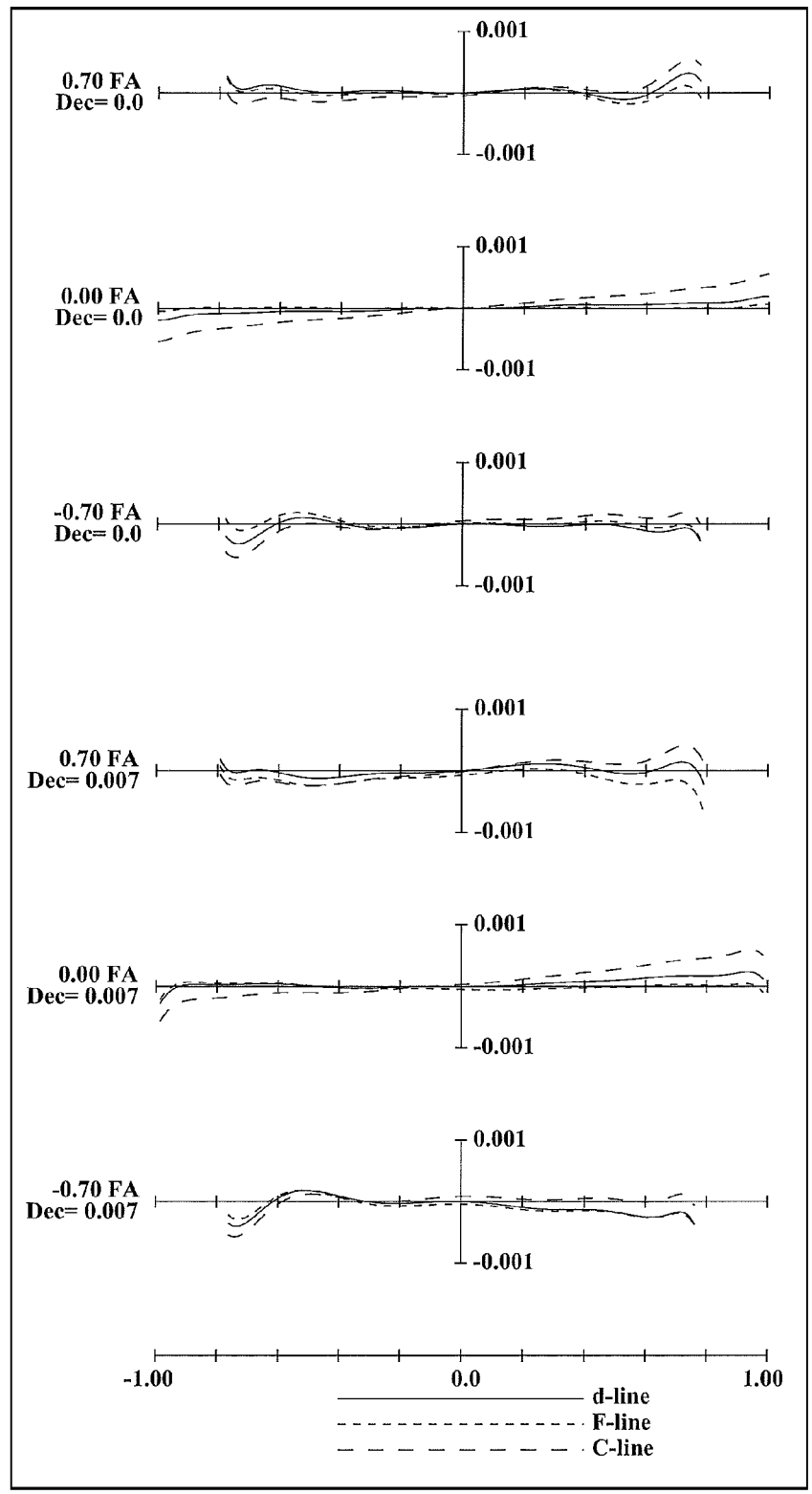
FIG. 12 is a lateral aberration diagram of the infinity in-focus condition of the inner focus lens system according to Numerical Example 4, in a basic state where image blur compensation is not performed and in an image blur compensation state.

As shown in FIG. 10, a first lens unit G1 having positive optical power, in order from the object side to the image side, comprises: a positive meniscus first lens element L1 with the convex surface facing the object side; a bi-convex second lens element L2; a bi-concave third lens element L3; and a positive meniscus fourth lens element L4 with the convex surface facing the object side. Among these, the second lens element L2 and the third lens element L3 are cemented with each other. The fourth lens element L4 has an aspheric object side surface.

A second lens unit G2 having negative optical power comprises solely a negative meniscus fifth lens element L5 with the convex surface facing the object side. In the second lens unit G2, an aperture diaphragm A is provided on the image side relative to the fifth lens element L5.

A third lens unit G3 having positive optical power comprises solely a bi-convex sixth lens element L6.

A fourth lens unit G4 having negative optical power, in order from the object side to the image side, comprises: a bi-concave seventh lens element L7; a positive meniscus eighth lens element L8 with the convex surface facing the object side; a bi-convex ninth lens element L9; and a negative meniscus tenth lens element L10 with the convex surface facing the image side. The seventh lens element L7 has two aspheric surfaces, and the ninth lens element L9 has two aspheric surfaces.

In the inner focus lens system according to Embodiment 4, in focusing from an infinity in-focus condition to a close-object in-focus condition, the second lens unit G2 moves to the image side along the optical axis, and the third lens unit G3 moves to the object side along the optical axis.

By moving the seventh lens element L7 as a part of the fourth lens unit G4 in the direction perpendicular to the optical axis, image point movement caused by vibration of the entire system can be compensated. That is, image blur caused by hand blurring, vibration and the like can be compensated optically.

(Embodiment 5)

Figure 13:
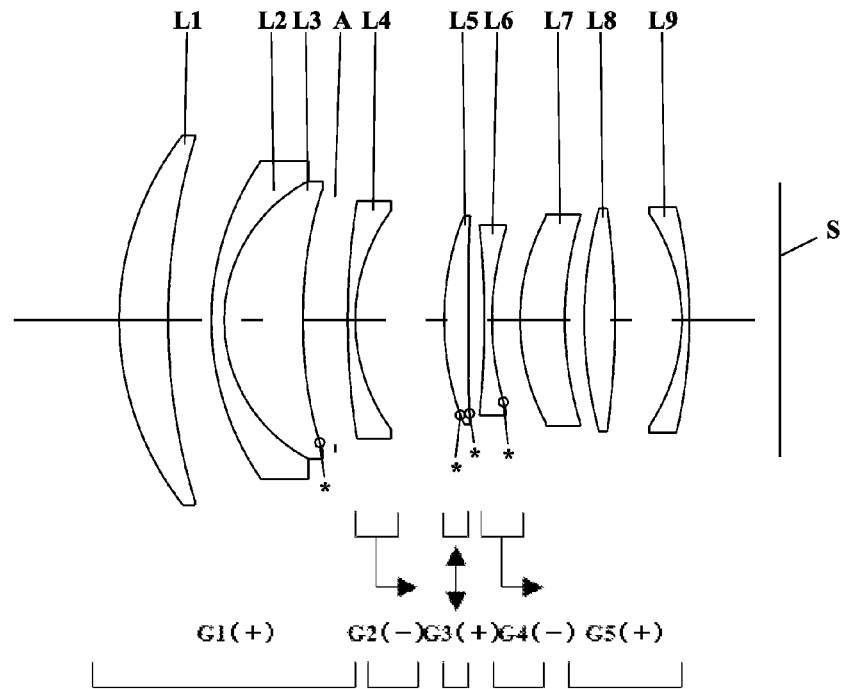
FIG. 13 is a lens arrangement diagram showing an infinity in-focus condition of an inner focus lens system according to Embodiment 5 (Numerical Example 5)
Figure 14:
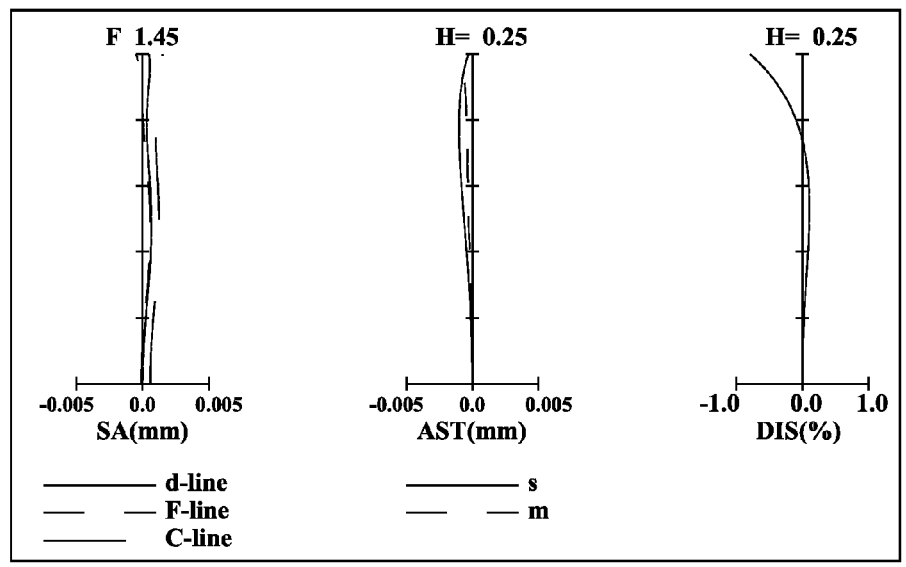
FIG. 14 is a longitudinal aberration diagram of the infinity in-focus condition of the inner focus lens system according to Numerical Example 5.
Figure 15:
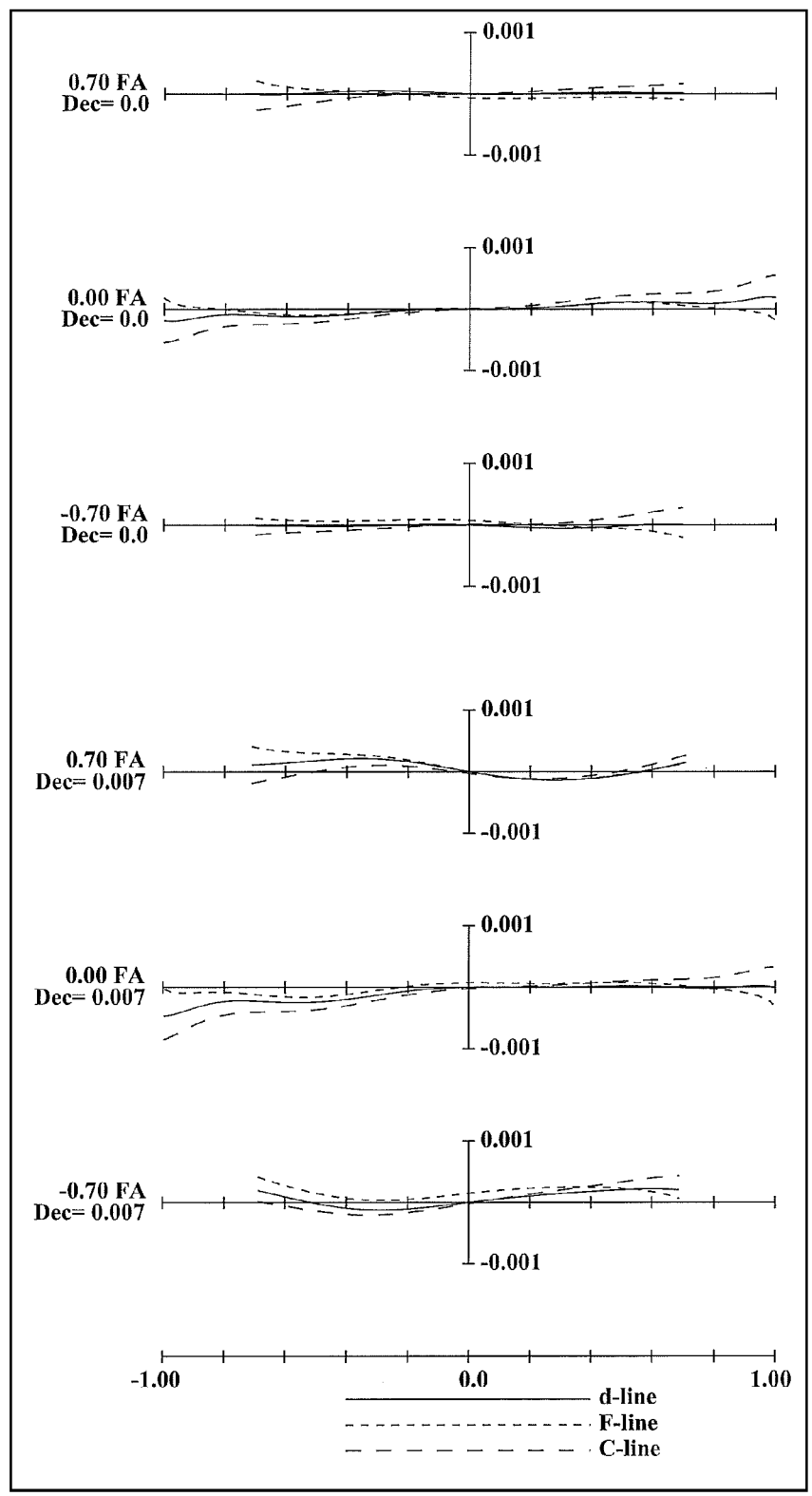
FIG. 15 is a lateral aberration diagram of the infinity in-focus condition of the inner focus lens system according to Numerical Example 5, in a basic state where image blur compensation is not performed and in an image blur compensation state.

As shown in FIG. 13, a first lens unit G1 having positive optical power, in order from the object side to the image side, comprises: a positive meniscus first lens element L1 with the convex surface facing the object side; a negative meniscus second lens element L2 with the convex surface facing the object side; and a positive meniscus third lens element L3 with the convex surface facing the object side. Among these, the second lens element L2 and the third lens element L3 are cemented with each other. The third lens element L3 has an aspheric image side surface. In the first lens unit G1, an aperture diaphragm A is provided on the image side relative to the third lens element L3.

A second lens unit G2 having negative optical power comprises solely a negative meniscus fourth lens element L4 with the convex surface facing the object side.

A third lens unit G3 having positive optical power comprises solely a positive meniscus fifth lens element L5 with the convex surface facing the object side. The fifth lens element L5 has two aspheric surfaces.

A fourth lens unit G4 having negative optical power comprises solely a bi-concave sixth lens element L6. The sixth lens element L6 has an aspheric image side surface.

A fifth lens unit G5 having positive optical power, in order from the object side to the image side, comprises: a positive meniscus seventh lens element L7 with the convex surface facing the object side; a bi-convex eighth lens element L8; and a negative meniscus ninth lens element L9 with the convex surface facing the image side.

In the inner focus lens system according to Embodiment 5, in focusing from an infinity in-focus condition to a close-object in-focus condition, the second lens unit G2 and the fourth lens unit G4 move to the image side along the optical axis.

By moving the third lens unit G3, i.e., the fifth lens element L5, in the direction perpendicular to the optical axis, image point movement caused by vibration of the entire system can be compensated. That is, image blur caused by hand blurring, vibration and the like can be compensated optically.

(Embodiment 6)

Figure 16:
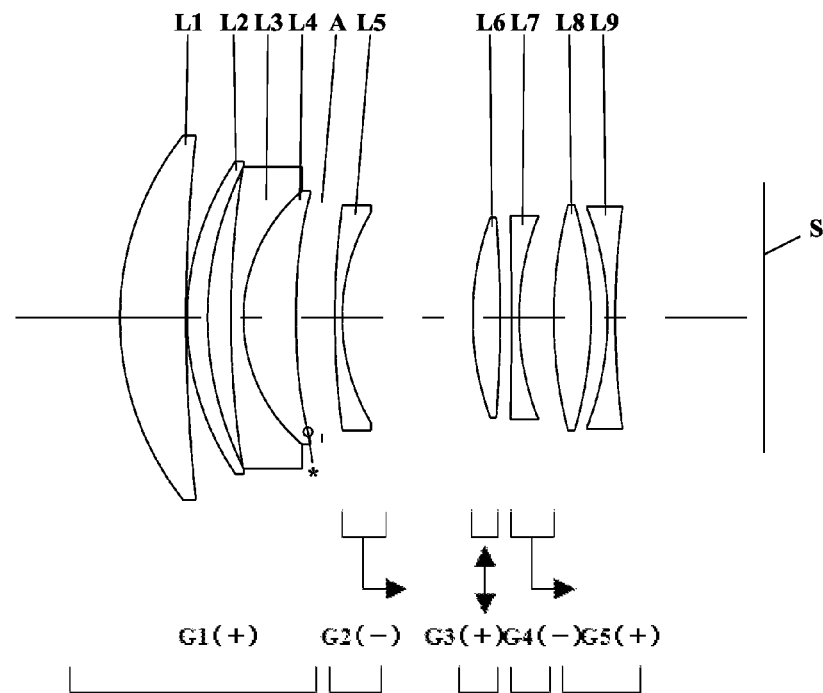
FIG. 16 is a lens arrangement diagram showing an infinity in-focus condition of an inner focus lens system according to Embodiment 6 (Numerical Example 6)
Figure 17:
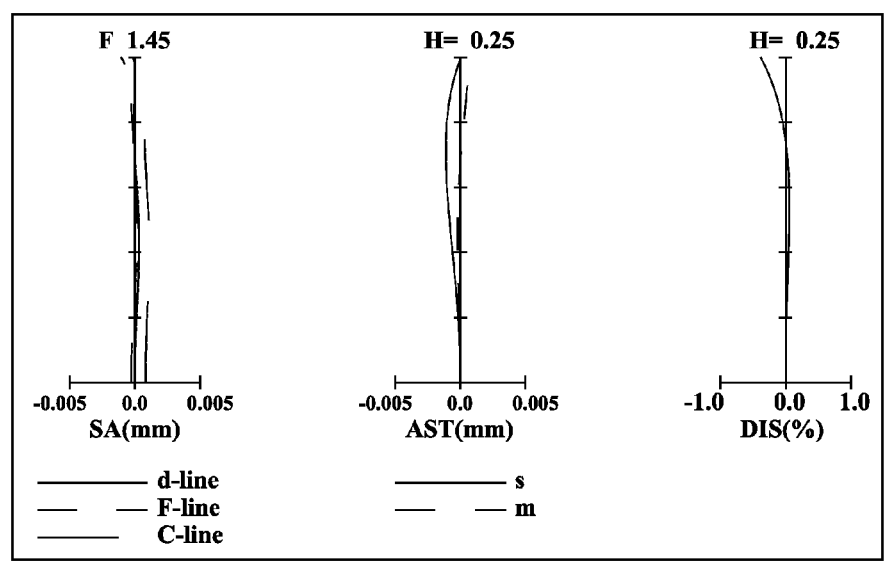
FIG. 17 is a longitudinal aberration diagram of the infinity in-focus condition of the inner focus lens system according to Numerical Example 6.
Figure 18:
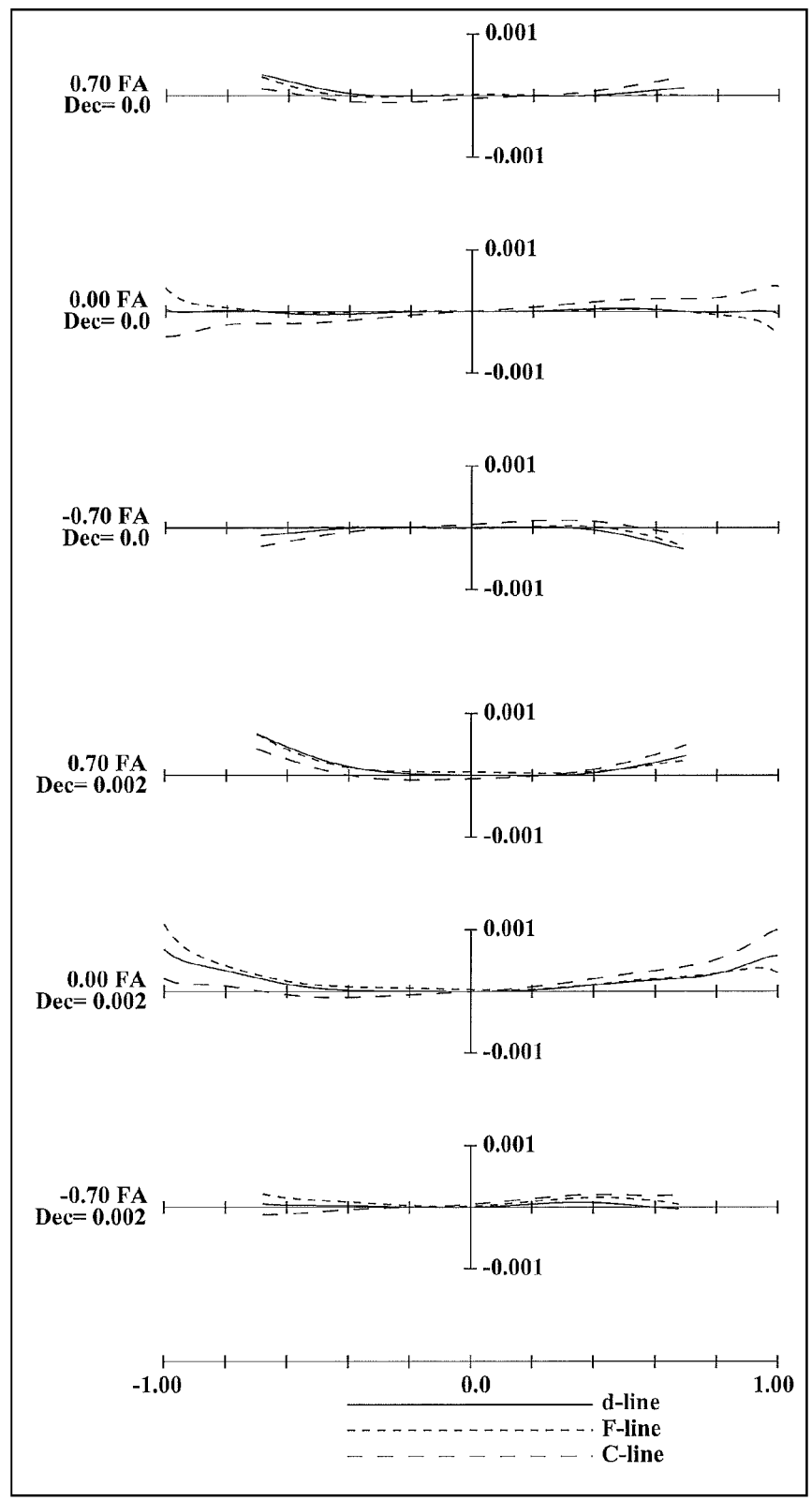
FIG. 18 is a lateral aberration diagram of the infinity in-focus condition of the inner focus lens system according to Numerical Example 6, in a basic state where image blur compensation is not performed and in an image blur compensation state.

As shown in FIG. 16, a first lens unit G1 having positive optical power, in order from the object side to the image side, comprises: a positive meniscus first lens element L1 with the convex surface facing the object side; a positive meniscus second lens element L2 with the convex surface facing the object side; a negative meniscus third lens element L3 with the convex surface facing the object side; and a positive meniscus fourth lens element L4 with the convex surface facing the object side. Among these, the third lens element L3 and the fourth lens element L4 are cemented with each other. The fourth lens element L4 has an aspheric image side surface. In the first lens unit G1, an aperture diaphragm A is provided on the image side relative to the fourth lens element L4.

A second lens unit G2 having negative optical power comprises solely a negative meniscus fifth lens element L5 with the convex surface facing the object side.

A third lens unit G3 having positive optical power comprises solely a bi-convex sixth lens element L6.

A fourth lens unit G4 having negative optical power comprises solely a bi-concave seventh lens element L7.

A fifth lens unit G5 having positive optical power, in order from the object side to the image side, comprises: a bi-convex eighth lens element L8; and a bi-concave ninth lens element L9.

In the inner focus lens system according to Embodiment 6, in focusing from an infinity in-focus condition to a close-object in-focus condition, the second lens unit G2 and the fourth lens unit G4 move to the image side along the optical axis.

By moving the third lens unit G3, i.e., the sixth lens element L6, in the direction perpendicular to the optical axis, image point movement caused by vibration of the entire system can be compensated. That is, image blur caused by hand blurring, vibration and the like can be compensated optically.

(Embodiment 7)

Figure 19:
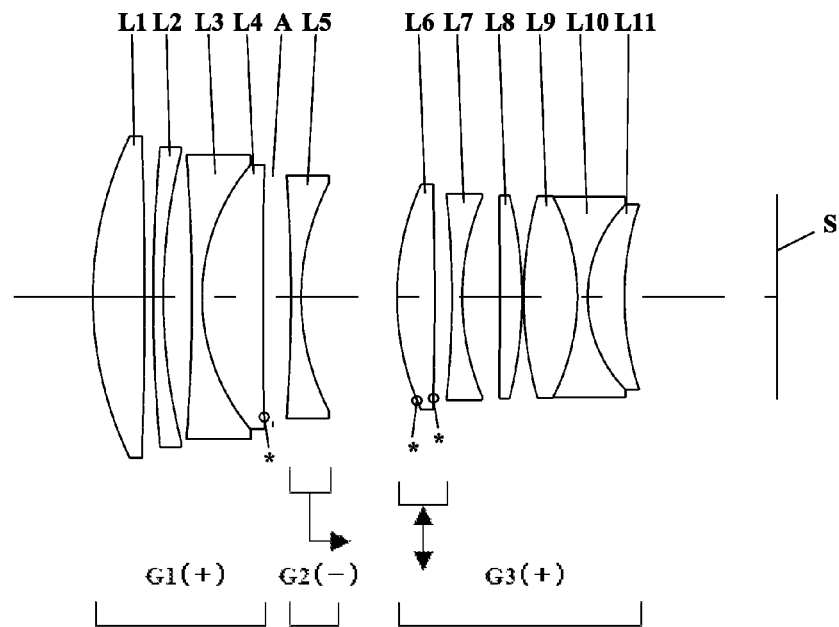
FIG. 19 is a lens arrangement diagram showing an infinity in-focus condition of an inner focus lens system according to Embodiment 7 (Numerical Example 7)
Figure 20:
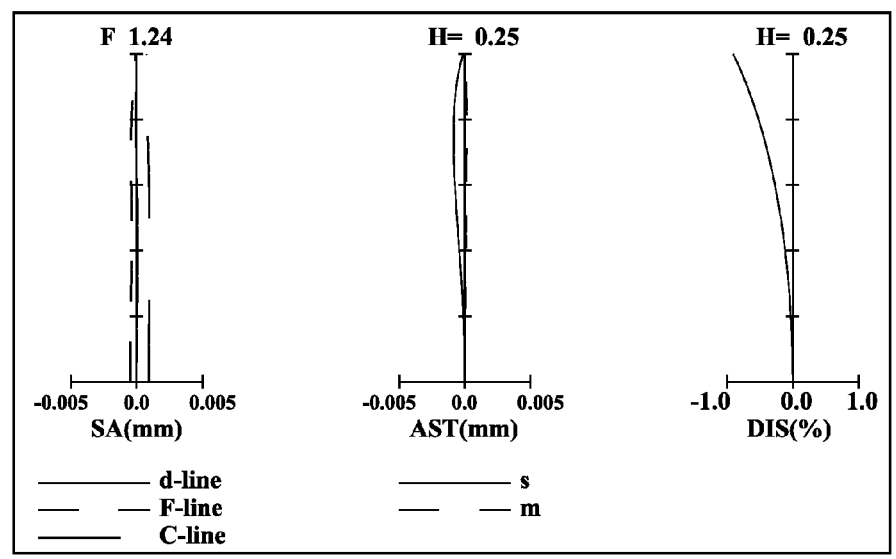
FIG. 20 is a longitudinal aberration diagram of the infinity in-focus condition of the inner focus lens system according to Numerical Example 7.
Figure 21:
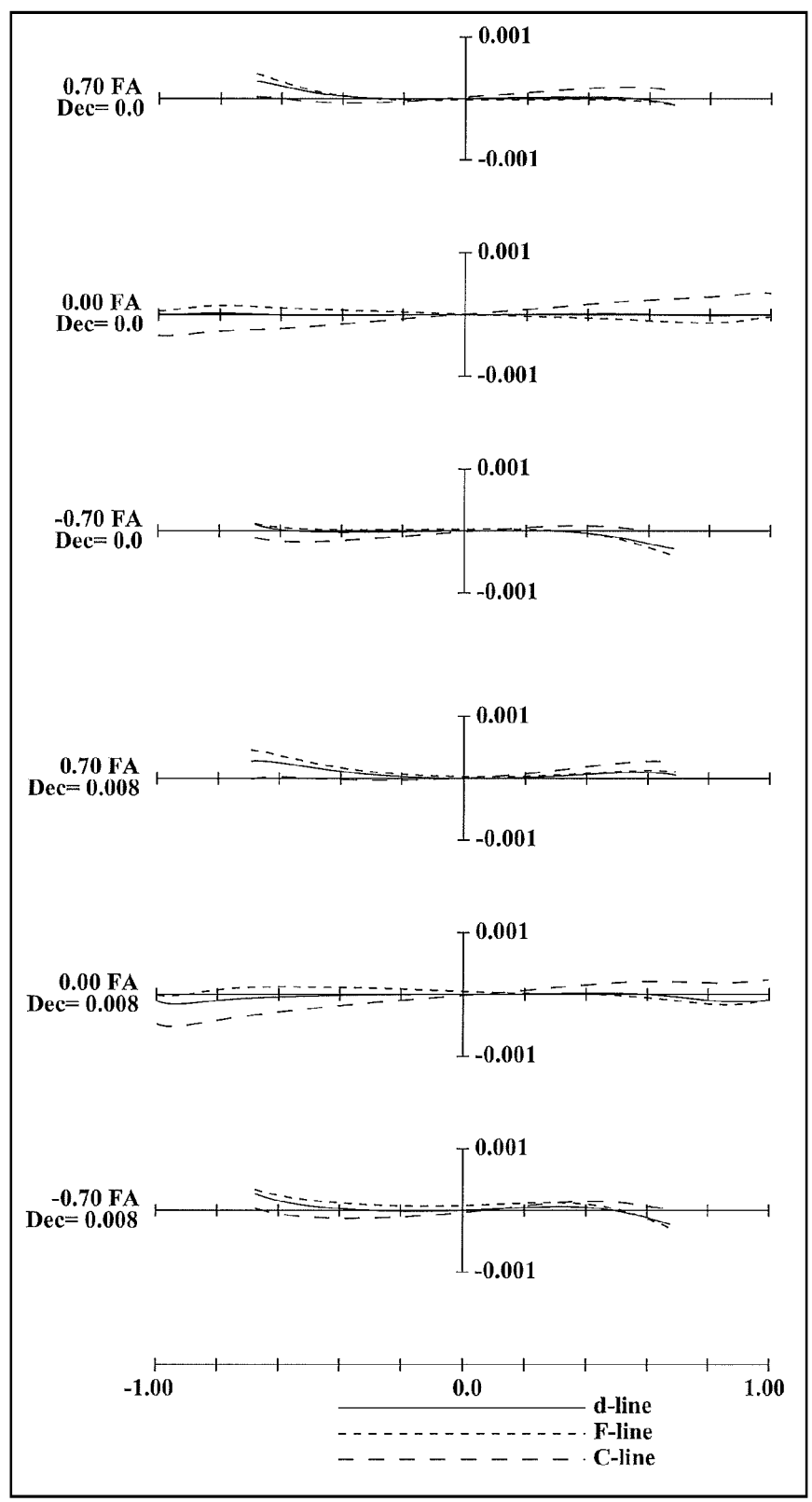
FIG. 21 is a lateral aberration diagram of the infinity in-focus condition of the inner focus lens system according to Numerical Example 7, in a basic state where image blur compensation is not performed and in an image blur compensation state.

As shown in FIG. 19, a first lens unit G1 having positive optical power, in order from the object side to the image side, comprises: a bi-convex first lens element L1; a negative meniscus second lens element L2 with the convex surface facing the object side; a bi-concave third lens element L3; and a bi-convex fourth lens element L4. Among these, the third lens element L3 and the fourth lens element L4 are cemented with each other. The fourth lens element L4 has an aspheric image side surface. In the first lens unit G1, an aperture diaphragm A is provided on the image side relative to the fourth lens element L4.

A second lens unit G2 having negative optical power comprises solely a bi-concave fifth lens element L5.

A third lens unit G3 having positive optical power, in order from the object side to the image side, comprises: a bi-convex sixth lens element L6; a bi-concave seventh lens element L7; a positive meniscus eighth lens element L8 with the convex surface facing the image side; a bi-convex ninth lens element L9; a bi-concave tenth lens element L10; and a positive meniscus eleventh lens element L11 with the convex surface facing the object side. Among these, the ninth lens element L9, the tenth lens element L10, and the eleventh lens element L11 are cemented with each other. The sixth lens element L6 has two aspheric surfaces.

In the inner focus lens system according to Embodiment 7, in focusing from an infinity in-focus condition to a close-object in-focus condition, the second lens unit G2 moves to the image side along the optical axis.

By moving the sixth lens element L6 as a part of the third lens unit G3 in the direction perpendicular to the optical axis, image point movement caused by vibration of the entire system can be compensated. That is, image blur caused by hand blurring, vibration and the like can be compensated optically.

In the inner focus lens systems according to Embodiments 1 to 7, the first lens unit G1 is fixed with respect to the image surface S in focusing from an infinity in-focus condition to a close-object in-focus condition. Therefore, fluctuation in spherical aberration associated with focusing is small, and thereby focusing can be performed with excellent imaging characteristics being maintained.

In the inner focus lens systems according to Embodiments 1 to 7, at least one of a lens element located closest to the image side in the lens system and a lens element located second closest to the image side in the lens system has negative optical power. Therefore, a back focal length can be shortened, and thereby the overall length of lens system can be reduced.

The inner focus lens systems according to Embodiments 1 to 7 are each configured such that a most image side lens unit located closest to the image side is fixed with respect to the image surface S in focusing from an infinity in-focus condition to a close-object in-focus condition. Therefore, aberration fluctuation caused by decentering during manufacture can be reduced.

The inner focus lens systems according to Embodiments 1 to 6 each are provided with at least two focusing lens units that move along the optical axis in focusing from an infinity in-focus condition to a close-object in-focus condition. Therefore, occurrence of spherical aberration in association with focusing is compensated by a plurality of focusing lens units, and thereby focusing can be performed with excellent imaging characteristics being maintained.

In the inner focus lens systems according to Embodiments 1 to 6, at least one of the plurality of focusing lens units is composed of a single lens element. Further, in the inner focus lens system according to Embodiment 7, the one focusing lens unit is composed of a single lens element. Therefore, high-speed and silent focusing can be performed.

In the inner focus lens systems according to Embodiments 1 to 6, at least one of the plurality of focusing lens units has negative optical power. Further, in the inner focus lens system according to Embodiment 7, the one focusing lens unit has negative optical power. Therefore, fluctuation in magnification chromatic aberration associated with focusing can be suppressed.

The inner focus lens systems according to Embodiments 1 to 7 each are provided with an image blur compensating lens unit that moves in the direction perpendicular to the optical axis in order to optically compensate image blur, and the image blur compensating lens unit is composed of a single lens element. Therefore, an actuator for moving the image blur compensating lens unit in the direction perpendicular to the optical axis is not increased in size, thereby realizing size reduction of the lens system. Further, occurrence of decentering coma aberration associated with image blur compensation can be suppressed.

The inner focus lens systems according to Embodiments 1 to 6 each are provided with at least two focusing lens units that move along the optical axis in focusing from an infinity in-focus condition to a close-object in-focus condition, and also are provided with the image blur compensating lens unit that moves in the direction perpendicular to the optical axis in order to optically compensate image blur. At least one of the plurality of focusing lens units is located on the object side relative to the image blur compensating lens unit. The inner focus lens system according to Embodiment 7 is provided with the focusing lens unit and the image blur compensating lens unit, and the focusing lens unit is located on the object side relative to the image blur compensating lens unit. Accordingly, in the inner focus lens systems according to Embodiments 1 to 7, it is possible to avoid a situation that the light beam diameter of the image blur compensating lens unit is increased and thereby the lens weight is increased. Therefore, an actuator for moving the image blur compensating lens unit in the direction perpendicular to the optical axis is not increased in size, thereby realizing size reduction of the lens system. Further, occurrence of decentering coma aberration associated with image blur compensation can be suppressed.

In the inner focus lens systems according to Embodiments 1 to 2 and 5 to 7, a lens element having an aspheric surface is located immediately on the object side relative to the aperture diaphragm A. Therefore, spherical aberration that occurs on the object side relative to the aperture diaphragm A can be reduced.

As described above, Embodiments 1 to 7 have been described as examples of art disclosed in the present application. However, the art in the present disclosure is not limited to these embodiments. It is understood that various modifications, replacements, additions, omissions, and the like have been performed in these embodiments to give optional embodiments, and the art in the present disclosure can be applied to the optional embodiments.

The following description is given for conditions that an inner focus lens system like the inner focus lens systems according to Embodiments 1 to 7 can satisfy. Here, a plurality of conditions is set forth for the inner focus lens system according to each embodiment. A configuration that satisfies all the plurality of conditions is most effective for the inner focus lens system. However, when an individual condition is satisfied, an inner focus lens system having the corresponding effect is obtained.

For example, in an inner focus lens system like the inner focus lens systems according to Embodiments 1 to 7, comprising lens units each being composed of at least one lens element, wherein a most object side lens unit located closest to the object side is provided, and the most object side lens unit is fixed with respect to the image surface in focusing from an infinity in-focus condition to a close-object in-focus condition (this lens configuration is referred to as a basic configuration of the embodiment, hereinafter), the following conditions (1) and (2) are simultaneously satisfied, or only the following condition (2)' is satisfied.

$$BF/Y<1.7 \quad (1)$$

$$(L \times F_{No})/f<2.2 \quad (2)$$

$$(L \times F_{No})/f<2.0 \quad (2)'$$

where

BF is a distance from an apex of an image side surface of a lens element located closest to an image side in the lens system, to the image surface, Y is a value expressed by the following formula:

$$Y=f \times \tan \omega$$

L is an overall length of lens system (an axial distance from an object side surface of a lens element located closest to the object side in the lens system, to the image surface), $F_{No}$ is a F-number of the lens system, f is a focal length of the lens system, and ω is a half view angle of the lens system.

The condition (1) sets forth the ratio of the back focal length of the lens system to a maximum image height. When the condition (1) is not satisfied, the back focal length is lengthened with respect to the maximum image height, which makes it difficult to achieve size reduction of the lens system.

The conditions (2) and (2)' each set forth the ratio of the overall length of lens system and the F-number of the entire lens system, to the focal length of the entire lens system. When the condition (2) is not satisfied and when the condition (2)' is not satisfied, in a bright lens system having small F-number, the ratio (telephoto ratio) of the overall length of lens system to the focal length cannot be reduced, which makes it difficult to achieve size reduction of the lens system.

When the following conditions (1)' and (2)' are simultaneously satisfied, or when only the following condition (2)" is satisfied, the above-mentioned effect is achieved more successfully.

$$BF/Y<1.6 \quad (1)'$$

$$(L \times F_{No})/f<2.0 \quad (2)'$$

$$(L \times F_{No})/f<1.9 \quad (2)''$$

It is beneficial that an inner focus lens system having the basic configuration like the inner focus lens systems according to Embodiments 1 to 7 satisfies the following condition (3):

$$0.2<D_{air}/Y<1.5 \quad (3)$$

where $D_{air}$ is a maximum value of air spaces between the lens elements constituting the lens system in an infinity in-focus condition, Y is the value expressed by the following formula:

$$Y=f \times \tan \omega$$

f is the focal length of the lens system, and

ω is the half view angle of the lens system.

The condition (3) sets forth the ratio of the maximum value of the air spaces between the lens elements constituting the lens system in an infinity in-focus condition, to the maximum image height. When the value goes below the lower limit of the condition (3), the air spaces constituting the lens system are reduced, which makes it difficult to compensate aspheric aberration. In addition, the degree of performance deterioration with respect to errors in the lens element intervals is increased, which makes assembly of the optical system difficult. When the value exceeds the upper limit of the condition (3), the air spaces constituting the lens system are increased, which makes it difficult to achieve size reduction of the lens system.

When at least one of the following conditions (3)' and (3)" is satisfied, the above-mentioned effect is achieved more successfully.

$$0.3<D_{air}/Y \quad (3)'$$

$$D_{air}/Y<1.2 \quad (3)''$$

It is beneficial that an inner focus lens system having the basic configuration and being provided with an image blur compensating lens unit that moves in the direction perpendicular to the optical axis in order to optically compensate image blur, like the inner focus lens systems according to Embodiments 1 to 7, satisfies the following condition (4):

$$0.2<|f_{OIS}/f|<2.0 \quad (4)$$

where $f_{OIS}$ is a focal length of the image blur compensating lens unit, and f is the focal length of the lens system.

The condition (4) sets forth the ratio of the focal length of the image blur compensating lens unit to the focal length of the lens system. When the value goes below the lower limit of the condition (4), the optical power of the image blur compensating lens unit becomes excessively strong, which makes it difficult to suppress occurrence of decentering coma aberration associated with image blur compensation. When the value exceeds the upper limit of the condition (4), the optical power of the image blur compensating lens unit becomes excessively weak, and thereby the amount of movement of the image blur compensating lens unit in the perpendicular direction during image blur compensation is increased, which makes it difficult to achieve size reduction of the lens system.

When at least one of the following conditions (4)' and (4)" is satisfied, the above-mentioned effect is achieved more successfully.

$$0.3<|f_{OIS}/f| \quad (4)'$$

$$|f_{OIS}/f|<1.5 \quad (4)''$$

It is beneficial that an inner focus lens system having the basic configuration and being provided with at least one focusing lens unit that moves along the optical axis in focusing from an infinity in-focus condition to a close-object in-focus condition, like the inner focus lens systems according to Embodiments 1 to 7, satisfies the following condition (5):

$$nd_{LF}<1.80 \quad (5)$$

where $nd_{LF}$ is an average value of refractive indices to the d-line of the lens elements constituting the focusing lens unit.

The condition (5) sets forth the average value of the refractive indices of the lens elements constituting the focusing lens unit. When the condition (5) is not satisfied, the specific gravity of the lens elements constituting the focusing lens unit is increased, and thereby the weight of the focusing lens unit is increased, which makes it difficult to realize high-speed and silent focusing.

When the following condition (5)' is satisfied, the above-mentioned effect is achieved more successfully.

$$nd_{LF}<1.75 \quad (5)'$$

It is beneficial that an inner focus lens system having the basic configuration like the inner focus lens systems according to Embodiments 1 to 7 satisfies the following condition (6):

$$nd_{L1} > 1.65 \quad (6)$$

where $nd_{L1}$ is a refractive index to the d-line of the lens element located closest to the object side in the lens system.

The condition (6) sets forth the refractive index of the lens element located closest to the object side in the lens system, i.e., the refractive index of the first lens element. When the condition (6) is not satisfied, spherical aberration that occurs in the first lens unit is increased, which makes it difficult to compensate the aberration.

When the following condition (6)' is satisfied, the above-mentioned effect is achieved more successfully.

$$nd_{L1} > 1.70 \quad (6)'$$

It is beneficial that an inner focus lens system having the basic configuration and being provided with at least one focusing lens unit that moves along the optical axis in focusing from an infinity in-focus condition to a close-object in-focus condition, like the inner focus lens systems according to Embodiments 1 to 7, satisfies the following condition (7):

$$TH_F/f < 0.035 \quad (7)$$

where $TH_F$ is an average value of axial thicknesses of the focusing lens units having negative optical power among all the focusing lens units, and f is the focal length of the lens system.

The condition (7) sets forth the ratio of the axial thicknesses of the focusing lens units having negative optical power, to the focal length of the entire lens system. When the condition (7) is not satisfied, the axial thicknesses of the focusing lens units having negative optical power become excessively large, which makes it difficult to suppress fluctuation in astigmatism associated with focusing. In addition, the weights of the focusing lens units having negative optical power are increased, which makes it difficult to realize high-speed and silent focusing.

When the following condition (7)' is satisfied, the above-mentioned effect is achieved more successfully.

$$TH_F/f < 0.030 \quad (7)'$$

The individual lens units constituting the inner focus lens systems according to Embodiments 1 to 7 are each composed exclusively of refractive type lens elements that deflect incident light by refraction (that is, lens elements of a type in which deflection is achieved at the interface between media having different refractive indices). However, the present disclosure is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved.

The individual lens elements constituting the inner focus lens systems according to Embodiments 1 to 7 may be lens elements each prepared by cementing a transparent resin layer made of ultraviolet-ray curable resin on a surface of a glass lens element. Because the optical power of the transparent resin layer is weak, the glass lens element and the transparent resin layer are totally counted as one lens element. In the same manner, when a lens element that is similar to a plane plate is located, the lens element that is similar to a plane plate is not counted as one lens element because the optical power of the lens element that is similar to a plane plate is weak.

(Embodiment 8)

Figure 22:
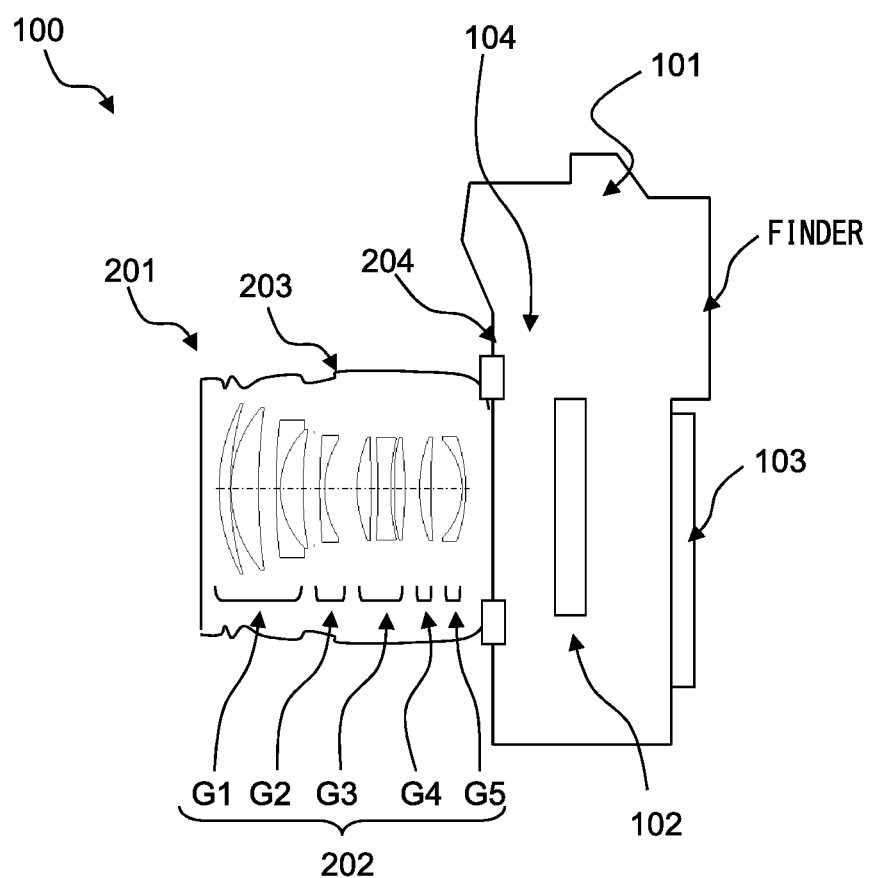
FIG. 22 is a schematic construction diagram of an interchangeable-lens type digital camera system according to Embodiment 8.

FIG. 22 is a schematic construction diagram of an interchangeable-lens type digital camera system according to Embodiment 8.

The interchangeable-lens type digital camera system 100 according to Embodiment 8 includes a camera body 101, and an interchangeable lens apparatus 201 which is detachably connected to the camera body 101.

The camera body 101 includes: an image sensor 102 which receives an optical image formed by an inner focus lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: an inner focus lens system 202 according to any of Embodiments 1 to 7; a lens barrel 203 which holds the inner focus lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 22, the inner focus lens system according to Embodiment 1 is employed as the inner focus lens system 202.

In Embodiment 8, since the inner focus lens system 202 according to any of Embodiments 1 to 7 is employed, a compact interchangeable lens apparatus having excellent imaging performance can be realized at low cost. Moreover, size reduction and cost reduction of the entire camera system 100 according to Embodiment 8 can be achieved.

In the interchangeable-lens type digital camera system according to Embodiment 8, the inner focus lens systems according to Embodiments 1 to 7 are shown as the inner focus lens system 202, and the entire focusing range need not be used in these inner focus lens systems. That is, in accordance with a desired focusing range, a range where satisfactory optical performance is obtained may exclusively be used.

An imaging device comprising each of the inner focus lens systems according to Embodiments 1 to 7, and an image sensor such as a CCD or a CMOS may be applied to a digital still camera, a digital video camera, a camera for a mobile terminal device such as a smart-phone, a surveillance camera in a surveillance system, a Web camera, a vehicle-mounted camera or the like.

As described above, Embodiment 8 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the inner focus lens systems according to Embodiments 1 to 7 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1+\sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is an n-th order aspherical coefficient.

FIGS. 2, 5, 8, 11, 14, 17, and 20 are longitudinal aberration diagrams of an infinity in-focus condition of the inner focus lens systems according to Numerical Examples 1 to 7, respectively.

Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each FIG., indicated as F), and the solid line, the short dash line and the long dash line indicate the characteristics to the d-line, the F-line and the C-line, respectively. In each astigmatism diagram, the vertical axis indicates the image height (in each FIG., indicated as H), and the solid line and the dash line indicate the characteristics to the sagittal plane (in each FIG., indicated as "s") and the meridional plane (in each FIG., indicated as "m"), respectively. In each distortion diagram, the vertical axis indicates the image height (in each FIG., indicated as H).

FIGS. 3, 6, 9, 12, 15, 18, and 21 are lateral aberration diagrams of an infinity in-focus condition of the inner focus lens systems according to Numerical Examples 1 to 7, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the third lens unit G3.

In the inner focus lens system according to each Numerical Example, the amount of movement of the image blur compensating lens unit in a direction perpendicular to the optical axis in an image blur compensation state in an infinity in-focus condition is as follows.

| Numerical Example | Amount of movement (mm) |
|---|---|
| 1 | 0.0061 |
| 2 | 0.0093 |
| 3 | 0.0073 |
| 4 | 0.0071 |
| 5 | 0.0073 |
| 6 | 0.0020 |
| 7 | 0.0086 |

In an infinity in-focus condition, the amount of image decentering in a case that the inner focus lens system inclines by a predetermined angle is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of an inner focus lens system is the same, the amount of parallel translation required for image blur compensation decreases with decreasing focal length of the entire inner focus lens system. Thus, at arbitrary focus positions, sufficient image blur compensation can be performed for image blur compensation angles up to a predetermined angle without degrading the imaging characteristics.

NUMERICAL EXAMPLE 1

The inner focus lens system of Numerical Example 1 corresponds to Embodiment 1 shown in FIG. 1. Table 1 shows the surface data of the inner focus lens system of Numerical Example 1. Table 2 shows the aspherical data. Table 3 shows the various data. Table 4 shows the lens unit data.

TABLE 1

| (Surface data) | | | | |
|---|---|---|---|---|
| Surface number | r | d | nd | vd |
| Object surface | ∞ | | | |
| 1 | 0.73640 | 0.04570 | 1.84666 | 23.8 |
| 2 | 1.18620 | 0.00360 | | |
| 3 | 0.51850 | 0.11210 | 1.71300 | 53.9 |
| 4 | 2.45570 | 0.07180 | | |
| 5 | 2.62240 | 0.01820 | 1.84666 | 23.8 |
| 6 | 0.34510 | 0.09320 | 1.58699 | 59.5 |
| 7* | 1.98980 | 0.04370 | | |
| 8 (Diaphragm) | ∞ | 0.02420 | | |
| 9 | 2.52030 | 0.01940 | 1.74330 | 49.2 |
| 10 | 0.37780 | 0.13410 | | |
| 11* | 0.53810 | 0.05610 | 1.76801 | 49.2 |
| 12* | −5.64260 | 0.02940 | | |

TABLE 1-continued (Surface data)

| Surface number | r | d | nd | vd |
|---|---|---|---|---|
| 13 | −3.27840 | 0.05200 | 1.76182 | 26.6 |
| 14 | 0.93750 | 0.01620 | | |
| 15* | −121.72600 | 0.04300 | 1.76801 | 49.2 |
| 16* | −1.03020 | 0.05920 | | |
| 17 | 0.59770 | 0.04610 | 1.92286 | 20.9 |
| 18 | 2.35130 | 0.12980 | | |
| 19 | −0.28760 | 0.01450 | 1.69895 | 30.0 |
| 20 | −0.62910 | (BF) | | |
| Image surface | ∞ | | | |

TABLE 2

(Aspherical data)

Surface No. 7

K = 0.00000E+00, A4 = 1.89214E+00, A6 = −9.00977E−01, A8 = 2.07279E+01 A10 = 0.00000E+00
Surface No. 11

K = 0.00000E+00, A4 = 4.35890E−01, A6 = −1.71833E+01, A8 = 3.53203E+01 A10 = −2.20450E+03
Surface No. 12

K = 0.00000E+00, A4 = 2.29105E+00, A6 = −3.77847E+01, A8 = 3.00788E+02 A10 = −2.46900E+03
Surface No. 15

K = 0.00000E+00, A4 = 1.18022E+01, A6 = −5.84875E+01, A8 = 6.47057E+02 A10 = 1.16652E+03
Surface No. 16

K = 0.00000E+00, A4 = 6.48047E+00, A6 = −4.96636E+01, A8 = 4.46478E+02 A10 = 0.00000E+00

TABLE 3

(Various data)

| Focal length | 1.0002 |
|---|---|
| F-number | 1.45702 |
| Half view angle | 14.2496 |
| Image height | 0.2545 |
| Overall length of lens system | 1.2121 |
| BF | 0.19977 |

TABLE 4

(Lens unit data)

| Lens unit | Initial surface No. | Focal length |
|---|---|---|
| 1 | 1 | 0.95733 |
| 2 | 9 | −0.60022 |
| 3 | 11 | 0.79175 |
| 4 | 17 | 0.85759 |
| 5 | 19 | −0.77148 |

NUMERICAL EXAMPLE 2

The inner focus lens system of Numerical Example 2 corresponds to Embodiment 2 shown in FIG. 4. Table 5 shows the surface data of the inner focus lens system of Numerical Example 2. Table 6 shows the aspherical data. Table 7 shows the various data. Table 8 shows the lens unit data.

TABLE 5

(Surface data)

| Surface number | r | d | nd | vd |
|---|---|---|---|---|
| Object surface | ∞ | | | |
| 1 | 0.79600 | 0.08420 | 1.84666 | 23.8 |
| 2 | 2.22810 | 0.03660 | | |
| 3 | 0.79180 | 0.10050 | 1.48749 | 70.4 |
| 4 | 13.99600 | 0.03710 | | |
| 5 | −38.11100 | 0.03030 | 1.84666 | 23.8 |
| 6 | 0.63710 | 0.08110 | | |
| 7 | 0.56090 | 0.01820 | 1.84666 | 23.8 |
| 8 | 0.32510 | 0.15720 | | |
| 9* | 2.07730 | 0.04550 | 1.80139 | 45.4 |
| 10 (Diaphragm) | ∞ | 0.02420 | | |
| 11 | 3.84090 | 0.01940 | 1.74330 | 49.2 |
| 12 | 0.42890 | 0.15560 | | |
| 13* | 0.68830 | 0.04850 | 1.80139 | 45.4 |
| 14 | 6.98780 | 0.02420 | | |
| 15 | 2.88520 | 0.01450 | 1.69895 | 30.0 |
| 16 | 0.54400 | 0.00630 | | |
| 17* | 0.54570 | 0.18030 | 1.80139 | 45.4 |
| 18* | 3.80310 | 0.04680 | | |
| 19 | 0.74850 | 0.04610 | 1.92286 | 20.9 |
| 20 | −10.23280 | 0.12620 | | |
| 21 | −0.34640 | 0.01450 | 1.92286 | 20.9 |
| 22 | −1.04010 | (BF) | | |
| Image surface | ∞ | | | |

TABLE 6

(Aspherical data)

Surface No. 9

K = 0.00000E+00, A4 = 6.95589E−01, A6 = 3.67280E−01, A8 = −2.13614E+00 A10 = 0.00000E+00
Surface No. 13

K = 0.00000E+00, A4 = −1.21486E+00, A6 = 1.97963E+01, A8 = −2.56762E+02 A10 = 9.39802E+02
Surface No. 17

K = 0.00000E+00, A4 = 2.83045E+00, A6 = −1.90029E+01, A8 = 2.08845E+02 A10 = −6.69473E+02
Surface No. 18

K = 0.00000E+00, A4 = −3.17054E−01, A6 = −1.97100E+01, A8 = 1.07629E+02 A10 = 0.00000E+00

TABLE 7

(Various data)

| Focal length | 0.9999 |
|---|---|
| F-number | 1.25098 |
| Half view angle | 14.3773 |
| Image height | 0.2545 |
| Overall length of lens system | 1.4548 |
| BF | 0.15748 |

TABLE 8

(Lens unit data)

| Lens unit | Initial surface No. | Focal length |
|---|---|---|
| 1 | 1 | 1.00856 |
| 2 | 11 | −0.65113 |
| 3 | 13 | 0.77731 |
| 4 | 19 | 0.75731 |
| 5 | 21 | −0.56849 |

NUMERICAL EXAMPLE 3

The inner focus lens system of Numerical Example 3 corresponds to Embodiment 3 shown in FIG. 7. Table 9 shows the surface data of the inner focus lens system of Numerical Example 3. Table 10 shows the aspherical data. Table 11 shows the various data. Table 12 shows the lens unit data.

TABLE 9

(Surface data)

| Surface number | r | d | nd | vd |
|---|---|---|---|---|
| Object surface | ∞ | | | |
| 1 | 0.64370 | 0.19910 | 1.71300 | 53.9 |
| 2 | 4.87130 | 0.11070 | | |
| 3 | 1.19590 | 0.03030 | 1.75700 | 47.7 |
| 4 | 2.20310 | 0.00120 | 1.52184 | 52.1 |
| 5* | 2.73740 | 0.06520 | | |
| 6 | −3.19200 | 0.01820 | 1.90366 | 31.3 |
| 7 | 0.46350 | 0.12690 | 1.62041 | 60.3 |
| 8 | −1.40860 | −0.00630 | | |
| 9 (Diaphragm) | ∞ | 0.02420 | | |
| 10 | 6.67320 | 0.01940 | 1.71300 | 53.9 |
| 11 | 0.48480 | 0.17250 | | |
| 12* | 0.56970 | 0.05920 | 1.80139 | 45.4 |
| 13* | 10.24870 | 0.02460 | | |
| 14 | −3.99390 | 0.01450 | 1.69895 | 30.0 |
| 15 | 0.77770 | 0.06380 | | |
| 16* | 0.72640 | 0.07580 | 1.62262 | 58.2 |
| 17 | −0.99390 | 0.11140 | | |
| 18 | 0.91110 | 0.03100 | 2.00100 | 29.1 |
| 19 | 4.50470 | 0.10060 | | |
| 20 | −0.33240 | 0.01450 | 1.53172 | 48.8 |
| 21 | 2.26870 | (BF) | | |
| Image surface | ∞ | | | |

TABLE 10

(Aspherical data)

Surface No. 5

K = 0.00000E+00, A4 = 1.29038E+00, A6 = −1.61668E+00,
A8 = 1.54259E+01 A10 = 8.31017E+00
Surface No. 12

K = 0.00000E+00, A4 = 1.81413E+00, A6 = 6.17009E+00,
A8 = −1.06518E+01 A10 = −3.34452E+02
Surface No. 13

K = 0.00000E+00, A4 = 3.16602E+00, A6 = 0.00000E+00,
A8 = 0.00000E+00 A10 = 0.00000E+00
Surface No. 16

K = 0.00000E+00, A4 = 2.99114E+00, A6 = −1.05307E+01,
A8 = 1.38336E+02 A10 = −1.03341E+03

TABLE 11

(Various data)

| | |
|---|---|
| Focal length | 1.0000 |
| F-number | 1.24848 |
| Half view angle | 14.1813 |
| Image height | 0.2545 |
| Overall length of lens system | 1.4062 |
| BF | 0.14939 |

TABLE 12

(Lens unit data)

| Lens unit | Initial surface No. | Focal length |
|---|---|---|
| 1 | 1 | 1.08074 |
| 2 | 10 | −0.73417 |
| 3 | 12 | 2.83958 |
| 4 | 16 | 0.68564 |
| 5 | 18 | 1.13605 |
| 6 | 20 | −0.54420 |

NUMERICAL EXAMPLE 4

The inner focus lens system of Numerical Example 4 corresponds to Embodiment 4 shown in FIG. 10. Table 13 shows the surface data of the inner focus lens system of Numerical Example 4. Table 14 shows the aspherical data. Table 15 shows the various data. Table 16 shows the lens unit data.

TABLE 13

(Surface data)

| Surface number | r | d | nd | vd |
|---|---|---|---|---|
| Object surface | ∞ | | | |
| 1 | 0.57630 | 0.16030 | 1.71300 | 53.9 |
| 2 | 4.02480 | 0.00240 | | |
| 3 | 0.75080 | 0.09590 | 1.71300 | 53.9 |
| 4 | −15.90400 | 0.02300 | 1.76182 | 26.6 |
| 5 | 0.58450 | 0.02020 | | |
| 6* | 0.71240 | 0.01700 | 1.69384 | 53.1 |
| 7 | 0.90650 | 0.03030 | | |
| 8 | 1.27140 | 0.01820 | 1.48749 | 70.4 |
| 9 | 0.40860 | 0.16980 | | |
| 10 (Diaphragm) | ∞ | 0.06230 | | |
| 11 | 0.77520 | 0.04690 | 1.59349 | 67.0 |
| 12 | −1.71510 | 0.01810 | | |
| 13* | −2.45850 | 0.01460 | 1.61035 | 57.9 |
| 14* | 0.46020 | 0.07470 | | |
| 15 | 0.40010 | 0.15290 | 1.48749 | 70.4 |
| 16 | 0.46970 | 0.01730 | | |
| 17* | 0.61440 | 0.17600 | 1.82080 | 42.7 |
| 18* | −0.85400 | 0.07140 | | |
| 19 | −0.34460 | 0.01460 | 1.76182 | 26.6 |
| 20 | −1.76520 | (BF) | | |
| Image surface | ∞ | | | |

TABLE 14

(Aspherical data)

Surface No. 6

K = 0.00000E+00, A4 = −1.54943E+00, A6 = 8.20887E+00,
A8 = −7.05660E+02
A10 = 1.71375E+04, A12 = −2.02551E+05, A14 = 9.29483E+05
Surface No. 13

K = 0.00000E+00, A4 = 1.37811E+00, A6 = 1.79304E+02,
A8 = −1.36859E+04
A10 = 3.99810E+05, A12 = −4.15966E+06, A14 = 0.00000E+00
Surface No. 14

K = 0.00000E+00, A4 = 1.19153E−01, A6 = 2.39605E+02,
A8 = −1.94738E+04
A10 = 6.34597E+05, A12 = −7.33098E+06, A14 = 0.00000E+00
Surface No. 17

K = 0.00000E+00, A4 = −5.12323E−02, A6 = −7.94354E+01,
A8 = 3.69661E+03
A10 = −8.12533E+04, A12 = 6.49584E+05, A14 = 0.00000E+00

TABLE 14-continued (Aspherical data)

Surface No. 18

K = 0.00000E+00, A4 = −1.20989E+00, A6 = −1.16894E+02,
A8 = 3.99049E+03
A10 = −7.74948E+04, A12 = 5.72833E+05, A14 = 0.00000E+00

TABLE 15

(Various data)

| | |
|---|---|
| Focal length | 1.0003 |
| F-number | 1.45617 |
| Half view angle | 14.1729 |
| Image height | 0.2545 |
| Overall length of lens system | 1.3220 |
| BF | 0.13607 |

TABLE 16

(Lens unit data)

| Lens unit | Initial surface No. | Focal length |
|---|---|---|
| 1 | 1 | 0.90593 |
| 2 | 8 | −1.24371 |
| 3 | 11 | 0.90593 |
| 4 | 13 | −1.62143 |

NUMERICAL EXAMPLE 5

The inner focus lens system of Numerical Example 5 corresponds to Embodiment 5 shown in FIG. 13. Table 17 shows the surface data of the inner focus lens system of Numerical Example 5. Table 18 shows the aspherical data. Table 19 shows the various data. Table 20 shows the lens unit data.

TABLE 17

(Surface data)

| Surface number | r | d | nd | vd |
|---|---|---|---|---|
| Object surface | ∞ | | | |
| 1 | 0.57010 | 0.09290 | 1.77250 | 49.6 |
| 2 | 1.18990 | 0.08190 | | |
| 3 | 0.53200 | 0.02420 | 1.72825 | 28.3 |
| 4 | 0.29700 | 0.14920 | 1.55332 | 71.7 |
| 5* | 0.96750 | 0.06060 | | |
| 6 (Diaphragm) | ∞ | 0.02420 | | |
| 7 | 1.45400 | 0.01450 | 1.48749 | 70.4 |
| 8 | 0.35170 | 0.16850 | | |
| 9* | 0.56410 | 0.04570 | 1.77250 | 49.5 |
| 10* | 42.16360 | 0.03030 | | |
| 11 | −1.72200 | 0.01450 | 1.68400 | 31.3 |
| 12* | 0.52780 | 0.05310 | | |
| 13 | 0.41370 | 0.08480 | 1.48749 | 70.4 |
| 14 | 0.66540 | 0.03690 | | |
| 15 | 0.80640 | 0.05810 | 2.00100 | 29.1 |
| 16 | −1.53720 | 0.12680 | | |
| 17 | −0.35890 | 0.01450 | 1.84666 | 23.8 |
| 18 | −0.93050 | (BF) | | |
| Image surface | ∞ | | | |

TABLE 18

(Aspherical data)

Surface No. 5

K = 0.00000E+00, A4 = 1.16534E+00, A6 = 5.62977E−01,
A8 = 2.56569E+01
A10 = 0.00000E+00

Surface No. 9

K = 0.00000E+00, A4 = 5.13449E−01, A6 = 2.94646E+01,
A8 = −3.48257E+02
A10 = 1.86060E+03

Surface No. 10

K = 0.00000E+00, A4 = 1.88801E+00, A6 = 0.00000E+00,
A8 = 0.00000E+00
A10 = 0.00000E+00

Surface No. 12

K = 0.00000E+00, A4 = −3.46522E+00, A6 = 1.75023E+01,
A8 = −3.30940E+02
A10 = 0.00000E+00

TABLE 19

(Various data)

| | |
|---|---|
| Focal length | 1.0000 |
| F-number | 1.45234 |
| Half view angle | 14.3871 |
| Image height | 0.2545 |
| Overall length of lens system | 1.2522 |
| BF | 0.17150 |

TABLE 20

(Lens unit data)

| Lens unit | Initial surface No. | Focal length |
|---|---|---|
| 1 | 1 | 0.95859 |
| 2 | 7 | −0.95576 |
| 3 | 9 | 0.73977 |
| 4 | 11 | −0.58907 |
| 5 | 13 | 0.74863 |

NUMERICAL EXAMPLE 6

The inner focus lens system of Numerical Example 6 corresponds to Embodiment 6 shown in FIG. 16. Table 21 shows the surface data of the inner focus lens system of Numerical Example 6. Table 22 shows the aspherical data. Table 23 shows the various data. Table 24 shows the lens unit data.

TABLE 21

(Surface data)

| Surface number | r | d | nd | vd |
|---|---|---|---|---|
| Object surface | ∞ | | | |
| 1 | 0.56510 | 0.12690 | 1.83481 | 42.7 |
| 2 | 3.17830 | 0.00240 | | |
| 3 | 0.53370 | 0.03910 | 2.00272 | 19.3 |
| 4 | 0.64020 | 0.04470 | | |
| 5 | 1.80630 | 0.02420 | 1.84666 | 23.8 |
| 6 | 0.32010 | 0.10090 | 1.52500 | 70.3 |
| 7* | 1.30800 | 0.05020 | | |
| 8 (Diaphragm) | ∞ | 0.02420 | | |
| 9 | 1.58180 | 0.01450 | 1.56732 | 42.8 |
| 10 | 0.39890 | 0.25050 | | |
| 11 | 0.56180 | 0.05270 | 1.80420 | 46.5 |

TABLE 21-continued (Surface data)

| Surface number | r | d | nd | vd |
|---|---|---|---|---|
| 12 | −2.37730 | 0.02180 | | |
| 13 | −8.65920 | 0.01450 | 1.69895 | 30.0 |
| 14 | 0.53010 | 0.06670 | | |
| 15 | 0.87490 | 0.07140 | 2.00100 | 29.1 |
| 16 | −0.76530 | 0.03210 | | |
| 17 | −0.57930 | 0.01450 | 1.72825 | 28.3 |
| 18 | 1.61810 | (BF) | | |
| Image surface | ∞ | | | |

TABLE 22

(Aspherical data)

Surface No.7
K= 0.00000E+00, A4= 1.61902E+00, A6= −3.36504E−01,
A8= 9.06181E+01

TABLE 23

(Various data)

| Focal length | 0.9998 |
|---|---|
| F-number | 1.45068 |
| Half view angle | 14.3346 |
| Image height | 0.2545 |
| Overall length of lens system | 1.2364 |
| BF | 0.28510 |

TABLE 24

(Lens unit data)

| Lens unit | Initial surface No. | Focal length |
|---|---|---|
| 1 | 1 | 1.04014 |
| 2 | 9 | −0.94443 |
| 3 | 11 | 0.56960 |
| 4 | 13 | −0.71421 |
| 5 | 15 | 1.11414 |

NUMERICAL EXAMPLE 7

The inner focus lens system of Numerical Example 7 corresponds to Embodiment 7 shown in FIG. 19. Table 25 shows the surface data of the inner focus lens system of Numerical Example 7. Table 26 shows the aspherical data. Table 27 shows the various data. Table 28 shows the lens unit data.

TABLE 25

(Surface data)

| Surface number | r | d | nd | vd |
|---|---|---|---|---|
| Object surface | ∞ | | | |
| 1 | 0.93690 | 0.13140 | 1.80420 | 46.5 |
| 2 | −12.19410 | 0.02170 | | |
| 3 | 4.06900 | 0.02610 | 1.59270 | 35.4 |
| 4 | 1.51390 | 0.07250 | | |
| 5 | −4.77530 | 0.02610 | 1.67270 | 32.2 |
| 6 | 0.52130 | 0.15600 | 1.80139 | 45.4 |
| 7* | −22.41950 | 0.02390 | | |
| 8 | ∞ | 0.04560 | | |

TABLE 25-continued (Surface data)

| Surface number | r | d | nd | vd |
|---|---|---|---|---|
| (Diaphragm) | | | | |
| 9 | −4.30740 | 0.02610 | 1.48749 | 70.4 |
| 10 | 0.63090 | 0.24340 | | |
| 11* | 0.72300 | 0.09620 | 1.58913 | 61.3 |
| 12* | −4.56290 | 0.04350 | | |
| 13 | −2.40770 | 0.02610 | 1.69895 | 30.0 |
| 14 | 0.65800 | 0.09500 | | |
| 15 | −188.72890 | 0.05690 | 2.00100 | 29.1 |
| 16 | −1.06500 | 0.00430 | | |
| 17 | 0.95870 | 0.13640 | 2.00100 | 29.1 |
| 18 | −0.55680 | 0.02610 | 1.76182 | 26.6 |
| 19 | 0.33700 | 0.09330 | 1.80420 | 46.5 |
| 20 | 0.75910 | (BF) | | |
| Image surface | ∞ | | | |

TABLE 26

(Aspherical data)

Surface No. 7

K = 0.00000E+00, A4 = 4.66046E−01, A6 = −7.56280E−01,
A8 = 2.19401E+00
A10 = 0.00000E+00
Surface No. 11

K = 0.00000E+00, A4 = 3.78057E−01, A6 = −5.34753E−01,
A8 = 0.00000E+00
A10 = 0.00000E+00
Surface No. 12

K = 0.00000E+00, A4 = 8.69077E−01, A6 = −1.13311E+00,
A8 = 5.25258E+00
A10 = −3.60363E+01

TABLE 27

(Various data)

| Focal length | 1.0002 |
|---|---|
| F-number | 1.24315 |
| Half view angle | 14.4014 |
| Image height | 0.2545 |
| Overall length of lens system | 1.7390 |
| BF | 0.38837 |

TABLE 28

(Lens unit data)

| Lens unit | Initial surface No. | Focal length |
|---|---|---|
| 1 | 1 | 1.22435 |
| 2 | 9 | −1.12689 |
| 3 | 11 | 0.77786 |

The following Table 29 shows the corresponding values to the individual conditions in the inner focus lens systems of each of Numerical Examples.

TABLE 29

(Values corresponding to conditions)

| | Condition | Numerical Example | | | | | | |
|---|---|---|---|---|---|---|---|---|
| | | 1 | 2 | 3 | 4 | 5 | 6 | 7 |
| (1) | BF/Y | 0.72 | 0.58 | 0.52 | 0.52 | 0.61 | 1.08 | 1.65 |
| (2) | $(L \times F_{No})/f$ | 1.76 | 1.81 | 1.75 | 1.92 | 1.85 | 1.79 | 2.16 |
| (3) | $D_{air}/Y$ | 0.54 | 0.57 | 0.68 | 0.88 | 0.64 | 0.93 | 1.04 |
| (4) | $|f_{OIS}/f|$ | 0.64 | 0.93 | 0.74 | 0.64 | 0.74 | 0.57 | 1.07 |
| (5) | $nd_{LF}$ | 1.7433 | 1.7433 | 1.7130 | 1.4875 | 1.4875 | 1.5673 | 1.4875 |
| (6) | $nd_{L1}$ | 1.8467 | 1.8467 | 1.7130 | 1.7130 | 1.7725 | 1.8348 | 1.8042 |
| (7) | $TH_F/f$ | 0.019 | 0.019 | 0.019 | 0.019 | 0.015 | 0.015 | 0.026 |

The present disclosure is applicable to a digital still camera, a digital video camera, a camera for a mobile terminal device such as a smart-phone, a surveillance camera in a surveillance system, a Web camera, a vehicle-mounted camera or the like. In particular, the present disclosure is applicable to a photographing optical system where high image quality is required like in a digital still camera system or a digital video camera system.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. An inner focus lens system comprising lens units each being composed of at least one lens element, wherein
   a most object side lens unit located closest to an object side is provided,
   the most object side lens unit is fixed with respect to an image surface in focusing from an infinity in-focus condition to a close-object in-focus condition, and
   the following conditions (1) and (2) are simultaneously satisfied, or only the following condition (2)' is satisfied:

$$BF/Y < 1.7 \quad (1)$$

$$(L \times F_{No})/f < 2.2 \quad (2)$$

$$(L \times F_{No})/f < 2.0 \quad (2)'$$

where
   BF is a distance from an apex of an image side surface of a lens element located closest to an image side in the lens system, to the image surface,
   Y is a value expressed by the following formula:

$$Y = f \times \tan \omega$$

L is an overall length of lens system (an axial distance from an object side surface of a lens element located closest to the object side in the lens system, to the image surface),
   $F_{No}$ is a F-number of the lens system,
   f is a focal length of the lens system, and
   ω is a half view angle of the lens system.

2. The inner focus lens system as claimed in claim 1, wherein
   the following condition (3) is satisfied:

$$0.2 < D_{air}/Y < 1.5 \quad (3)$$

where
   $D_{air}$ is a maximum value of air spaces between the lens elements constituting the lens system in an infinity in-focus condition,
   Y is the value expressed by the following formula:

$$Y = f \times \tan \omega$$

f is the focal length of the lens system, and
   ω is the half view angle of the lens system.

3. The inner focus lens system as claimed in claim 1, wherein
   at least one of the lens element located closest to the image side in the lens system and a lens element located second closest to the image side in the lens system has negative optical power.

4. The inner focus lens system as claimed in claim 1, wherein
   at least a first focusing lens unit and a second focusing lens unit are provided as focusing lens units that move along an optical axis in focusing from an infinity in-focus condition to a close-object in-focus condition.

5. The inner focus lens system as claimed in claim 4, wherein
   at least one of the first focusing lens unit and the second focusing lens unit is composed of a single lens element.

6. The inner focus lens system as claimed in claim 4, wherein
   at least one of the first focusing lens unit and the second focusing lens unit has negative optical power.

7. The inner focus lens system as claimed in claim 1, wherein
   an image blur compensating lens unit is provided, that moves in a direction perpendicular to an optical axis in order to optically compensate image blur, and
   the following condition (4) is satisfied:

$$0.2 < |f_{OIS}/f| < 2.0 \quad (4)$$

where
   $f_{OIS}$ is a focal length of the image blur compensating lens unit, and
   f is the focal length of the lens system.

8. The inner focus lens system as claimed in claim 1, wherein
   at least one focusing lens unit is provided, that moves along an optical axis in focusing from an infinity in-focus condition to a close-object in-focus condition, and the at least one focusing lens unit satisfies the following condition (5):

$$nd_{LF} < 1.80 \quad (5)$$

where $nd_{LF}$ is an average value of refractive indices to the d-line of lens elements constituting the focusing lens unit.

9. The inner focus lens system as claimed in claim 1, wherein the following condition (6) is satisfied:

$$nd_{L1} > 1.65 \quad (6)$$

where $nd_{L1}$ is a refractive index to the d-line of the lens element located closest to the object side in the lens system.

10. The inner focus lens system as claimed in claim 1, wherein at least one focusing lens unit is provided, that moves along an optical axis in focusing from an infinity in-focus condition to a close-object in-focus condition, and the at least one focusing lens unit satisfies the following condition (7):

$$TH_F/f < 0.035 \quad (7)$$

where $TH_F$ is an average value of axial thicknesses of the focusing lens units having negative optical power among all the focusing lens units, and f is the focal length of the lens system.

11. The inner focus lens system as claimed in claim 1, wherein in order from the object side to the image side, at least a first focusing lens unit and a second focusing lens unit are provided as focusing lens units that move along an optical axis in focusing from an infinity in-focus condition to a close-object in-focus condition, an image blur compensating lens unit is provided, that moves in a direction perpendicular to the optical axis in order to optically compensate image blur, and the first focusing lens unit is located on the object side relative to the image blur compensating lens unit.

12. An interchangeable lens apparatus comprising:

an inner focus lens system as claimed in claim 1; and a lens mount section which is connectable to a camera body including an image sensor for receiving an optical image formed by the inner focus lens system and converting the optical image into an electric image signal.

13. A camera system comprising:

an interchangeable lens apparatus including an inner focus lens system as claimed in claim 1; and a camera body which is detachably connected to the interchangeable lens apparatus via a camera mount section, and includes an image sensor for receiving an optical image formed by the inner focus lens system and converting the optical image into an electric image signal.

* * * * *